US011589388B2

(12) United States Patent
Luo et al.

(10) Patent No.: US 11,589,388 B2
(45) Date of Patent: Feb. 21, 2023

(54) SHARING CHANNEL OCCUPANCY TIME OF A NODE IN AN INTEGRATED ACCESS BACKHAUL NETWORK

(71) Applicant: QUALCOMM Incorporated, San Diego, CA (US)

(72) Inventors: Jianghong Luo, Skillman, NJ (US); Xiaoxia Zhang, San Diego, CA (US); Jing Sun, San Diego, CA (US); Navid Abedini, Somerset, NJ (US); Tao Luo, San Diego, CA (US); Luca Blessent, Whitehouse Station, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 1 day.

(21) Appl. No.: 17/081,867

(22) Filed: Oct. 27, 2020

(65) Prior Publication Data

US 2021/0378010 A1    Dec. 2, 2021

Related U.S. Application Data

(60) Provisional application No. 63/030,185, filed on May 26, 2020.

(51) Int. Cl.
*H04W 74/08* (2009.01)
*H04W 88/14* (2009.01)
*H04W 16/14* (2009.01)

(52) U.S. Cl.
CPC ....... *H04W 74/0816* (2013.01); *H04W 16/14* (2013.01); *H04W 88/14* (2013.01)

(58) Field of Classification Search
None
See application file for complete search history.

(56) References Cited

U.S. PATENT DOCUMENTS

| 2019/0349079 | A1* | 11/2019 | Novlan | H04W 72/0446 |
| 2020/0053655 | A1* | 2/2020 | Ghosh | H04W 88/10 |
| 2020/0053779 | A1* | 2/2020 | Jeon | H04B 7/0695 |

(Continued)

FOREIGN PATENT DOCUMENTS

| WO | WO-2020039346 A1 * | 2/2020 | | H04L 45/302 |
| WO | WO-2020144656 A1 * | 7/2020 | | H04L 47/782 |

OTHER PUBLICATIONS

International Search Report and Written Opinion—PCT/US2021/026925—ISAEPO—dated Aug. 9, 2021.

(Continued)

*Primary Examiner* — Jamaal Henson
(74) *Attorney, Agent, or Firm* — Qualcomm Incorporated

(57) ABSTRACT

Wireless communications systems and methods related to sharing channel occupancy time (COT) for a channel in an unlicensed 5G spectrum in an integrated access backhaul (IAB) network are provided. In some aspects, an IAB node of the IAB network may perform a channel access procedure to acquire the COT and share the COT with a parent IAB node and/or a child IAB node for the parent IAB node and/or child IAB node to communicate back with the COT initiating IAB node. The sharing of the COT with the parent IAB node and/or child IAB node may also include a sharing of the same COT between a distributed unit and a mobile terminal of the COT-initiating IAB node.

30 Claims, 22 Drawing Sheets

(56) References Cited

U.S. PATENT DOCUMENTS

| | | | |
|---|---|---|---|
| 2020/0053799 A1* | 2/2020 | Jeon | H04W 74/006 |
| 2020/0120725 A1* | 4/2020 | Mildh | H04W 76/12 |
| 2020/0146076 A1 | 5/2020 | Islam et al. | |
| 2020/0154266 A1* | 5/2020 | Novlan | H04W 72/0406 |
| 2021/0007011 A1* | 1/2021 | Zhu | H04B 17/40 |
| 2021/0068154 A1* | 3/2021 | Jia | H04W 74/008 |
| 2021/0211939 A1* | 7/2021 | Teyeb | H04L 47/26 |
| 2022/0015143 A1* | 1/2022 | Tiirola | H04B 7/15 |
| 2022/0060246 A1 | 2/2022 | Tiirola et al. | |

OTHER PUBLICATIONS

"3rd Generation Partnership Project, Technical Specification Group Radio Access Network, Physical Layer Procedures for Shared Spectrum Channel Access (Release 16)", 3GPP Standard, Technical Specification, 3GPP TS 37.213, 3RD Generation Partnership Project, Mobile Competence Centre 650, Route Des Lucioles, F-06921 Sophia-Antipolis Cedex, France, vol. RAN WG1, No. V16.1.0 Apr. 3, 2020, XP051893817, pp. 1-25, paragraphs [4.1.1 ] [4.1.3], [4.1.6], [4.2.1] - [4.2.1.2.3], paragraph [04.0].

Qualcomm Incorporated: "Channel Access Procedures for NR Unlicensed," 3GPP Draft, 3GPP TSG RAN WG1 Meeting #97, R1-1907261, 7.2.2.2.1, Channel Access Procedures for NR Unlicensed, 3RD Generation Partnership Project (3GPP), Mobile Competence Centre, 650, Route Des Lucioles, F-06921, Sophia-Antipolis Cedex, France, vol. Ran WG1, No. Reno, US; May 13, 2019-May 17, 2019, May 4, 2019 (May 4, 2019), XP051728701, 18 Pages.

* cited by examiner

Table 4.1.1-1: Channel Access Priority Class

| Channel Access Priority Class (p) | $m_p$ | $CW_{min,p}$ | $CW_{max,p}$ | $T_{mcot,p}$ | allowed $CW_p$ sizes |
|---|---|---|---|---|---|
| 1 | 1 | 3 | 7 | 2 ms | {3,7} |
| 2 | 1 | 7 | 15 | 3 ms | {7,15} |
| 3 | 3 | 15 | 63 | 8 or 10 ms | {15,31,63} |
| 4 | 7 | 15 | 1023 | 8 or 10 ms | {15,31,63,127,255,511,1023} |

FIG. 7B

SHARING CHANNEL OCCUPANCY TIME OF A NODE IN AN INTEGRATED ACCESS BACKHAUL NETWORK

CROSS REFERENCE TO RELATED APPLICATIONS

The present application claims priority to and the benefit of the U.S. Provisional Patent Application No. 63/030,185, filed May 26, 2020, titled "Sharing Channel Occupancy Time of a Node in an Integrated Access Backhaul Network," which is hereby incorporated by reference in its entirety as if fully set forth below and for all applicable purposes.

TECHNICAL FIELD

This application generally relates to wireless communication systems, and more particularly to methods and systems configured to facilitate the sharing, in an integrated access backhaul (IAB) network, of channel occupancy time (COT) for a channel in an unlicensed 5G spectrum.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of base stations (BSs), each simultaneously supporting communication for multiple communication devices, which may be otherwise known as user equipment (UE).

To meet the growing demands for expanded mobile broadband connectivity, wireless communication technologies are advancing from the LTE technology to a fifth generation (5G) new radio (NR) technology. 5G NR may provision for access traffic and backhaul traffic with increased throughput (e.g., gigabit-level). Access traffic refers to traffic between an access node (e.g., a base station) and a UE. Backhaul traffic refers to traffic among access nodes and a core network.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Wireless communications systems and methods related to sharing channel occupancy time (COT) for a channel in an unlicensed 5G spectrum in an integrated access backhaul (IAB) network are provided. In some aspects, an IAB node of the IAB network may perform a channel access procedure to acquire the COT and share the COT with a parent IAB node and/or a child IAB node for communicating with the COT-initiating IAB node. The sharing of the COT with the parent IAB node and/or child IAB node may also include a sharing of the same COT between a distributed unit and a mobile terminal of the COT-initiating IAB node.

In an aspect of the present disclosure, a method of wireless communication performed by an integrated access backhaul (IAB) node including a first entity and a second entity is presented. The method can comprise performing, for signal transmission by the first entity, a first channel access procedure to acquire a channel occupancy time (COT) for a channel in an unlicensed 5G spectrum. The method can further comprise allowing the second entity to access the channel and communicate a communication signal via the channel, during the COT. The method can further comprise performing a second channel access procedure for the second entity to access the channel and communicate the communication signal, during the COT. In some aspects, the first entity and the second entity are co-located in the IAB node; and one of the first entity or the second entity is a distributed unit (DU) of the IAB node and the other entity is a mobile terminal (MT) of the IAB node.

In an additional aspect of the disclosure, a method of wireless communication performed by an integrated access backhaul (IAB) node including a first entity and a second entity co-located with the first entity is presented. The method can comprise performing, for signal transmission by the first entity, a first channel access procedure to acquire a channel occupancy time (COT) for a channel in an unlicensed 5G spectrum. The method can further comprise communicating, via the second entity, a first communication signal with a third entity to allow the third entity to access the channel and communicate with the IAB, during the COT. The method can further comprise receiving, at the IAB, a second communication signal from the third entity during the COT. In some aspects, the first entity is a first distributed unit (DU), the second entity is a mobile terminal (MT) and the third entity is a parent DU of the IAB. In yet other aspects, the first entity is a first MT, the second entity is a DU and the third entity is a user equipment (UE) or a child MT of the IAB.

In an additional aspect of the disclosure, a method of wireless communication performed by a first entity of a first integrated access backhaul (IAB) node is disclosed. The method can comprise performing, for signal transmission by the first entity, a first channel access procedure to acquire a channel occupancy time (COT) for a channel in an unlicensed 5G spectrum. The method can further comprise communicating a first communication signal with a second entity to allow the second entity to access the channel and communicate with the first entity, during the COT. The method can further comprise receiving a second communication signal from the second entity during the COT. In some aspects, the first entity is a distributed unit (DU) of the first IAB node, and the second entity is either (i) a user equipment (UE) or (ii) a mobile terminal (MT) of a second IAB node that is a child node of the first IAB node. In some aspects, the first entity is a MT of the first IAB node, and the second entity is a DU of a second IAB node that is a parent node to the first IAB node.

In an additional aspect of the present disclosure, an apparatus comprising a processor is disclosed. The processor can be configured to perform, for signal transmission by a first entity of an integrated access backhaul (IAB) node, a first channel access procedure to acquire a channel occupancy time (COT) for a channel in an unlicensed 5G spectrum. Further, the processor can be configured to allow a second entity of the IAB node to access the channel and communicate a communication signal via the channel, during the COT. The processor can be further configured to perform a second channel access procedure for the second entity to access the channel and communicate the communication signal, during the COT. In some aspects, the first entity and the second entity are co-located in the IAB node; and one of the first entity or the second entity is a distributed unit (DU) of the IAB and the other entity is a mobile terminal (MT) of the IAB.

In an additional aspect of the present disclosure, an apparatus comprising a processor and a transceiver is disclosed. The processor can be configured to perform, for signal transmission by a first entity of an integrated access backhaul (IAB) node, a first channel access procedure to acquire a channel occupancy time (COT) for a channel in an unlicensed 5G spectrum. The transceiver can be configured to communicate, via a second entity of the IAB node co-located with the first entity, a first communication signal with a third entity to allow the third entity to access the channel and communicate with the IAB, during the COT. Further, the transceiver can be configured to receive, at the IAB node, a second communication signal from the third entity during the COT. In some aspects, the first entity is a first distributed unit (DU), the second entity is a mobile terminal (MT) and the third entity is a parent DU of the IAB node. In yet other aspects, the first entity is a first MT, the second entity is a DU and the third entity is a user equipment (UE) or a child MT of the IAB node.

In an additional aspect of the present disclosure, an apparatus comprising a processor and a transceiver is disclosed. The processor can be configured to perform, for signal transmission by a first entity of a first integrated access backhaul (IAB) node, a first channel access procedure to acquire a channel occupancy time (COT) for a channel in an unlicensed 5G spectrum. The transceiver can be configured to communicate a first communication signal with a second entity to allow the second entity to access the channel and communicate with the first entity, during the COT; and receive a second communication signal from the second entity during the COT. In some aspects, the first entity is a distributed unit (DU) of the first IAB node, and the second entity is either (i) a user equipment (UE) or (ii) a mobile terminal (MT) of a second IAB node that is a child node of the first IAB node. In yet some aspects, the first entity is a MT of the first IAB node, and the second entity is a DU of a second IAB node that is a parent node to the first IAB node.

In an additional aspect of the present disclosure, a non-transitory computer-readable medium (CRM) having program code recorded thereon is disclosed. The program code can comprise code for causing an integrated access backhaul (IAB) node that includes a first entity and a second entity to perform, for signal transmission by the first entity, a first channel access procedure to acquire a channel occupancy time (COT) for a channel in an unlicensed 5G spectrum. The program code can further comprise code for causing the IAB node to allowing the second entity to access the channel and communicate a communication signal via the channel, during the COT. The program code can further comprise code for causing the IAB node to performing a second channel access procedure for the second entity to access the channel and communicate the communication signal, during the COT. In some aspects, the first entity and the second entity are co-located in the IAB node; and one of the first entity or the second entity is a distributed unit (DU) of the IAB node and the other entity is a mobile terminal (MT) of the IAB node.

In an additional aspect of the present disclosure, a non-transitory computer-readable medium (CRM) having program code recorded thereon is disclosed. The program code can comprise code for causing an integrated access backhaul (IAB) node that includes a first entity and a second entity co-located with the first entity to perform, for signal transmission by the first entity, a first channel access procedure to acquire a channel occupancy time (COT) for a channel in an unlicensed 5G spectrum. The program code can further comprise code for causing the IAB node to communicate, via the second entity, a first communication signal with a third entity to allow the third entity to access the channel and communicate with the IAB node, during the COT. The program code can further comprise code for causing the IAB node to receive, at the IAB node, a second communication signal from the third entity during the COT. In some aspects, the first entity is a first distributed unit (DU), the second entity is a mobile terminal (MT) and the third entity is a parent DU of the IAB node, or the first entity is a first MT, the second entity is a DU and the third entity is a user equipment (UE) or a child MT of the IAB node.

In an additional aspect of the present disclosure, a non-transitory computer-readable medium (CRM) having program code recorded thereon is disclosed. The program code can comprise code for causing a first entity of a first integrated access backhaul (IAB) node to perform, for signal transmission by the first entity, a first channel access procedure to acquire a channel occupancy time (COT) for a channel in an unlicensed 5G spectrum. The program code can further comprise code for causing the first entity to communicate a first communication signal with a second entity to allow the second entity to access the channel and communicate with the first entity, during the COT. The program code can further comprise code for causing the first entity to receive a second communication signal from the second entity during the COT. In some aspects, the first entity is a distributed unit (DU) of the first IAB node, and the second entity is either (i) a user equipment (UE) or (ii) a mobile terminal (MT) of a second IAB node that is a child node of the first IAB node; or the first entity is a MT of the first IAB node, and the second entity is a DU of a second IAB node that is a parent node to the first IAB node.

In an additional aspect of the present disclosure, an apparatus comprises means for performing, for signal transmission by a first entity of an integrated access backhaul (IAB) node including a first entity and a second entity, a first channel access procedure to acquire a channel occupancy time (COT) for a channel in an unlicensed 5G spectrum. The apparatus can further comprise means for allowing the second entity to access the channel and communicate a communication signal via the channel during the COT. The apparatus can further comprise means for performing a second channel access procedure for the second entity to access the channel and communicate the communication signal, during the COT. In some aspects, the first entity and the second entity are co-located in the IAB node; and one of the first entity or the second entity is a distributed unit (DU) of the IAB node and the other entity is a mobile terminal (MT) of the IAB node.

In an additional aspect of the present disclosure, an apparatus comprises means for performing, for signal transmission by a first entity of an integrated access backhaul (IAB) node including the first entity and a second entity co-located with the first entity, a first channel access procedure to acquire a channel occupancy time (COT) for a channel in an unlicensed 5G spectrum. The apparatus can further comprise means for communicating, via the second entity, a first communication signal with a third entity to allow the third entity to access the channel and communicate with the IAB node, during the COT. The apparatus can further comprise means for receiving, at the IAB node, a second communication signal from the third entity during the COT. In some aspects, the first entity is a first distributed unit (DU), the second entity is a mobile terminal (MT) and the third entity is a parent DU of the IAB node, or the first entity is a first MT, the second entity is a DU and the third entity is a user equipment (UE) or a child MT of the IAB node.

In an additional aspect of the present disclosure, an apparatus comprises means for performing, for signal transmission by a first entity of a first integrated access backhaul (IAB) node, a first channel access procedure to acquire a channel occupancy time (COT) for a channel in an unlicensed 5G spectrum. The apparatus can further comprise means for communicating a first communication signal with a second entity to allow the second entity to access the channel and communicate with the first entity, during the COT. The apparatus can further comprise means for receiving a second communication signal from the second entity during the COT. In some aspects, the first entity is a distributed unit (DU) of the first IAB node, and the second entity is either (i) a user equipment (UE) or (ii) a mobile terminal (MT) of a second IAB node that is a child node of the first IAB node; or the first entity is a MT of the first IAB node, and the second entity is a DU of a second IAB node that is a parent node to the first IAB node.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIGS. 7A-7E illustrate channel access procedures for unlicensed new radio (NR) spectrum according to aspects of the present disclosure.

DETAILED DESCRIPTION

Figure 1:
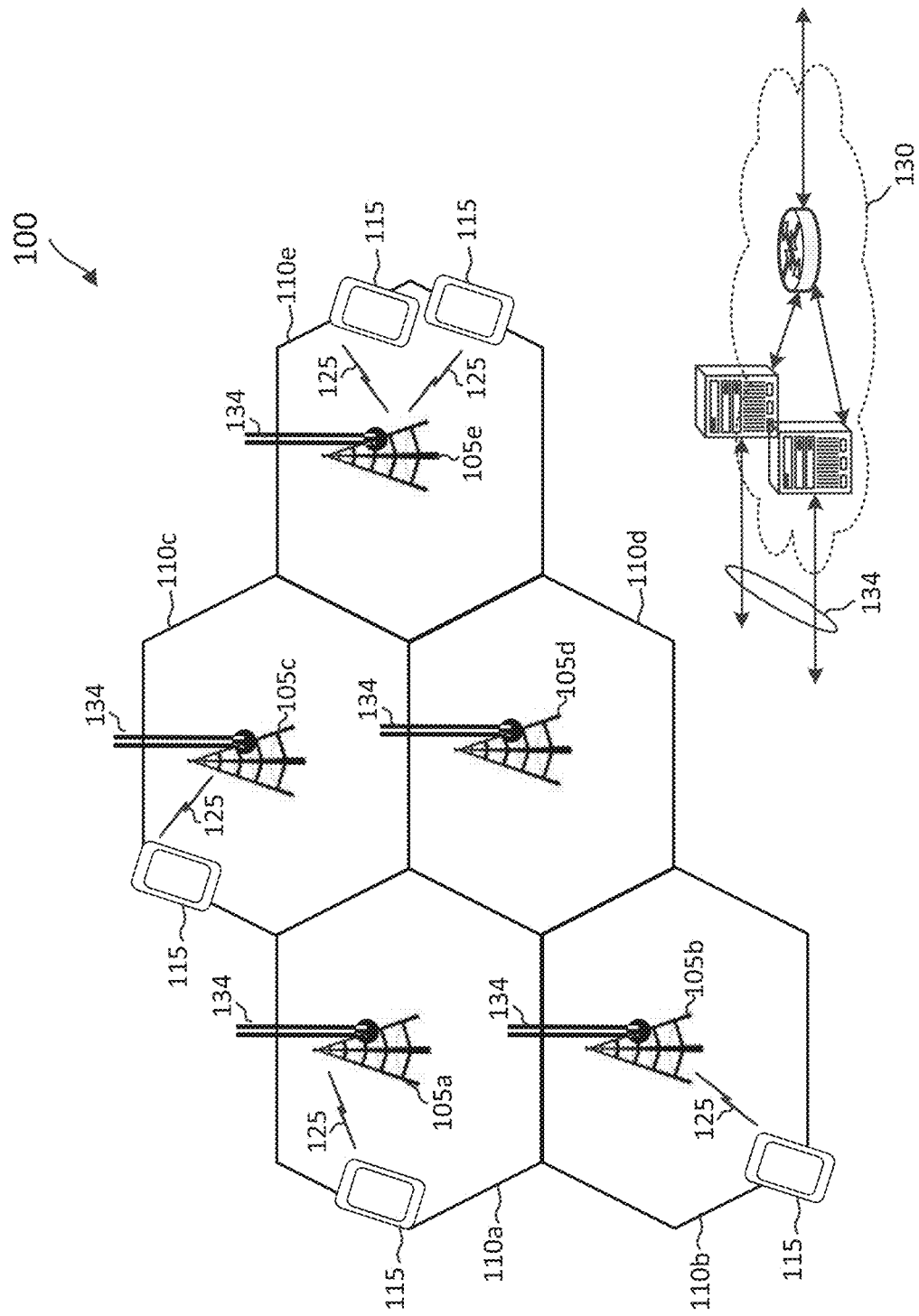
FIG. 1 illustrates a wireless communication network according to aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, 5$^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an Ultra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing (SCS), may efficiently address operating diverse services across diverse spectrum and diverse deployments. For example, in various outdoor and macro coverage deployments of less than 3 GHz FDD/TDD implementations, SCS may occur with 15 kHz, for example over 5, 10, 20 MHz, and the like bandwidth (BW). For other various outdoor and small cell coverage deployments of TDD greater than 3 GHz, SCS may occur with 30 kHz over 80/100 MHz BW. For other various indoor wideband implementations, using a TDD over the unlicensed portion of the 5 GHz band, the SCS may occur with 60 kHz over a 160 MHz BW. Finally, for various deployments transmitting with mmWave components at a TDD of 28 GHz, the SCS may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink (UL)/downlink (DL) scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects or examples set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may include at least one element of a claim.

The present application describes mechanisms for the sharing of COT between IAB nodes of an IAB network. The sharing may occur between units or components of the same IAB node (e.g., between DU and MT of the same IAB) as well as between neighboring IAB nodes (i.e., IAB nodes connected by backhaul links) or between IAB node and a UE (i.e., IAB nodes linked by access links). Aspects of the technology discussed herein can provide several benefits. For example, COT-sharing improves the efficient use of IAB network resources. This is because a COT acquired by a first IAB node and remaining after a DL or UL transmission by the first IAB node can be shared by the first IAB node with its parent IAB node or child IAB node for that parent IAB node's or child IAB node's communications with the first IAB node. Further, COT-sharing between IAB nodes allows the IAB network to have low latency, as the IAB nodes can use already acquired COT for communication with other IAB nodes after performing a type2 channel access procedure rather than performing a type1 channel access procedure, wherein normally a type2 procedure is much simpler and quicker procedure for evaluating the idleness of channel for next transmission. In some aspects, a channel access procedure can refer to a procedure based on sensing that evaluates the availability of a channel for performing transmissions, as discussed in the 3GPP standard document technical specification "3GPP TS 37.213 (Release 16)", which is incorporated herein by reference in its entirety. In addition, the COT-sharing may improve the capabilities of IAB networks to provide extremely high data rates to network users.

FIG. 1 illustrates a wireless communication network 100 according to aspects of the present disclosure. The network 100 includes a plurality of BSs 105, a plurality of UEs 115, and a core network 130. The network 100 may be a LTE network, a LTE-A network, a millimeter wave (mmW) network, a new radio (NR) network, a 5G network, or any other successor network to LTE.

The BSs 105 may wirelessly communicate with the UEs 115 via one or more BS antennas. Each BS 105 may provide communication coverage for a respective geographic coverage area 110. In 3GPP, the term "cell" can refer to this particular geographic coverage area of a BS and/or a BS subsystem serving the coverage area, depending on the context in which the term is used. In the example shown in FIG. 1, the BSs 105a, 105b, 105c, 105d, and 105e are examples of macro BSs for the coverage areas 110a, 110b, 110c, 110d, and 110e, respectively.

Communication links 125 shown in the network 100 may include uplink (UL) transmissions from a UE 115 to a BS 105, or downlink (DL) transmissions, from a BS 105 to a UE 115. The communication links 125 are referred to as wireless access links. The UEs 115 may be dispersed throughout the network 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

The BSs 105 may communicate with the core network 130 and with one another via optical fiber links 134. The core network 130 may provide user authentication, access authorization, tracking, Internet Protocol (IP) connectivity, and other access, routing, or mobility functions. At least some of the BSs 105 (e.g., which may be an example of an evolved NodeB (eNB), a next generation NodeB (gNB), or an access node controller (ANC)) may interface with the core network 130 through the backhaul links 134 (e.g., S1, S2, etc.) and may perform radio configuration and scheduling for communication with the UEs 115. In various examples, the BSs 105 may communicate, either directly or indirectly (e.g., through core network 130), with each other over the backhaul links 134 (e.g., X1, X2, etc.).

Each BS 105 may also communicate with a number of UEs 115 through a number of other BSs 105, where the BS 105 may be an example of a smart radio head. In alternative configurations, various functions of each BS 105 may be distributed across various BSs 105 (e.g., radio heads and access network controllers) or consolidated into a single BS 105.

In some implementations, the network 100 utilizes orthogonal frequency division multiplexing (OFDM) on the downlink and single-carrier frequency division multiplexing (SC-FDM) on the UL. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. The system bandwidth may also be partitioned into subbands.

In an aspect, the BSs 105 can assign or schedule transmission resources (e.g., in the form of time-frequency resource blocks) for DL and UL transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes, for example, about 10. Each subframe can be divided into slots, for example, about 2. In a frequency-division duplexing (FDD) mode, simultaneous UL and DL transmissions may occur in different frequency bands. For example, each subframe includes a UL subframe in a UL frequency band and a DL subframe in a DL frequency band. In a time-division duplexing (TDD) mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational bandwidth or frequency band, each positioned at a pre-defined time and a pre-defined frequency. For example, a BS 105 may transmit cell-specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication. A UL-centric subframe may include a longer duration for UL communication.

In an aspect, a UE 115 attempting to access the network 100 may perform an initial cell search by detecting a primary synchronization signal (PSS) from a BS 105. The PSS may enable synchronization of period timing and may indicate a physical layer identity value. The UE 115 may then receive a secondary synchronization signal (SSS). The SSS may enable radio frame synchronization, and may provide a cell identity value, which may be combined with the physical layer identity value to identify the cell. The SSS may also enable detection of a duplexing mode and a cyclic prefix length. Some systems, such as TDD systems, may transmit an SSS but not a PSS. Both the PSS and the SSS may be located in a central portion of a carrier, respectively. After receiving the PSS and SSS, the UE 115 may receive a master information block (MIB), which may be transmitted in the physical broadcast channel (PBCH). The MIB may contain system bandwidth information, a system frame number (SFN), and a Physical Hybrid-ARQ Indicator Channel (PHICH) configuration. After decoding the MIB, the UE 115 may receive one or more system information blocks (SIBs). For example, SIB1 may contain cell access parameters and scheduling information for other Ms. Decoding SIB1 may enable the UE 115 to receive SIB2. SIB2 may contain radio resource configuration (RRC) configuration information related to random access channel (RACH) procedures, paging, physical uplink control channel (PUCCH), physical uplink shared channel (PUSCH), power control, SRS, and cell barring. After obtaining the MIB and/or the SIBS, the UE 115 can perform random access procedures to establish a connection with the BS 105. After establishing the connection, the UE 115 and the BS 105 can enter a normal operation stage, where operational data may be exchanged.

Figure 2:
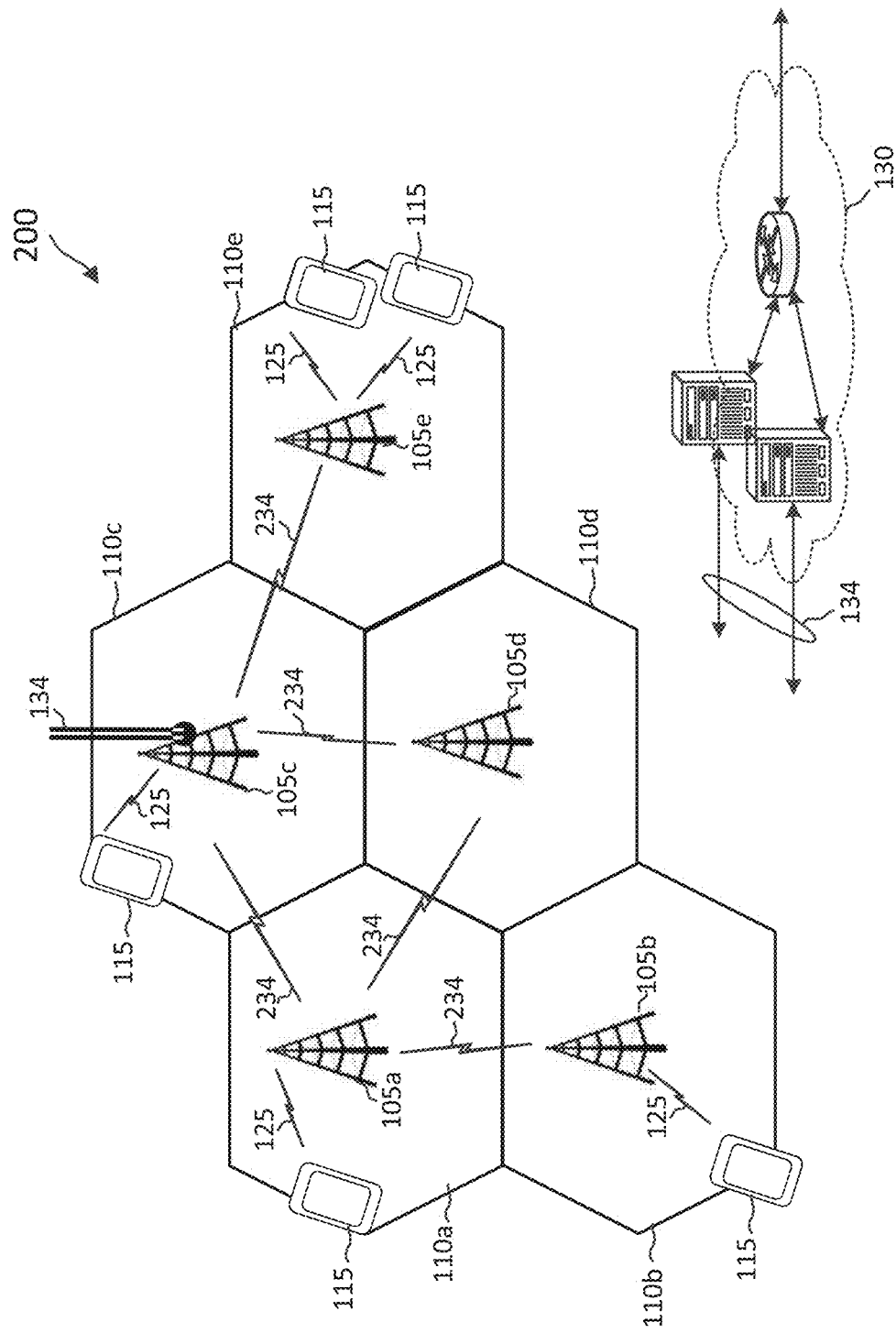
FIG. 2 illustrates an integrated access backhaul (IAB) network according to aspects of the present disclosure.

FIG. 2 illustrates an IAB network 200 according to aspects of the present disclosure. The network 200 is substantially similar to the network 100. For example, the BSs 105 communicates with the UEs 115 over the wireless access links 125. However, in the network 200, only one BS (e.g., the BS 105c) is connected to an optical fiber backhaul link 134. The other BSs 105a, 105b, 105d, and 105e wirelessly communicate with each other and with the BS 105c over wireless backhaul links 234. In the present disclosure, the term IAB donor may also be used to refer to BS 105c and the term IAB node (of the IAB network 200) to any of the other BSs (e.g., BSs 105a, 105b, 105d, and 105e). The BS 105c connected to the optical fiber backhaul link 134 may function as an anchor for the other BSs 105a, 105b, 105d, and 105e to communicate the core network 130, as described in greater detail herein. The wireless access links 125 and the wireless backhaul links 234 may share resources for communications in the network 200. The network 200 may also be referred to as a self-backhauling network. The network 200 can improve wireless link capacity, reduce latency, and reduce deployment cost.

Figure 3:
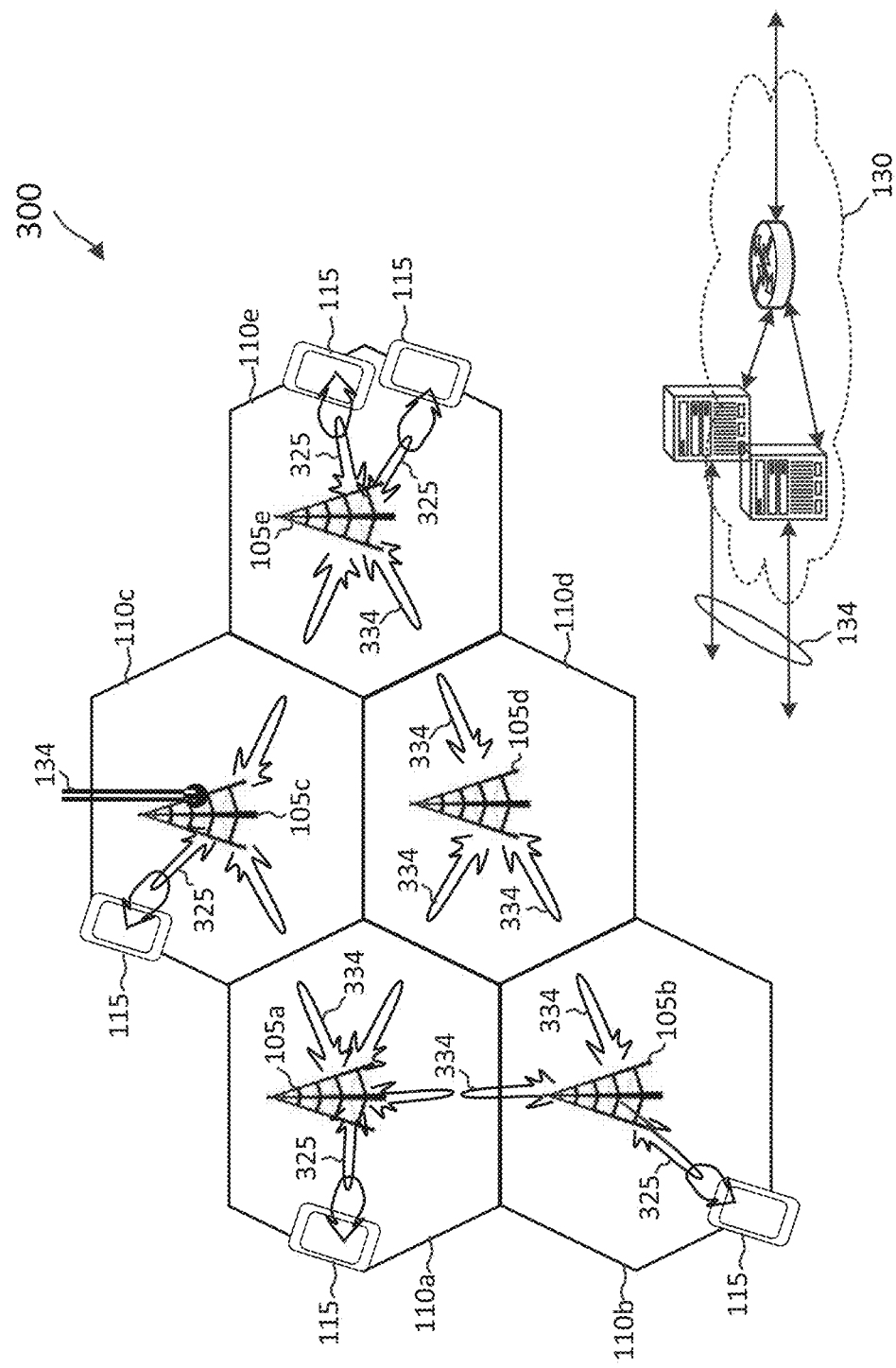
FIG. 3 illustrates an IAB network according to aspects of the present disclosure.

FIG. 3 illustrates an IAB network 300 according to aspects of the present disclosure. The network 300 is similar to the network 200 and illustrates the use of millimeter wave (mmWave) frequency band for communications. In the network 300, a single BS (e.g., the BS 105c) is connected to an optical fiber backhaul link 134. The other BSs 105a, 105b, 105d, and 105e communicate with each other and with the BS 105c using directional beams 334, for example, over the wireless links 234. The BSs 105 may also communicate with the UEs 115 using narrow directional beams 325, for example, over the wireless links 125. The directional beams 334 may be substantially similar to the directional beams 325. For example, the BSs 105 may use analog beamforming and/or digital beamforming to form the directional beams 334 and 325 for transmission and/or reception. Similarly, the UEs 115 may use analog beamforming and/or digital beamforming to form the directional beams 325 for transmission and/or reception. The use of mmWave can increase network throughput and reduce latency. The use of narrow directional beams 334 and 325 can minimize inter-link interference. Thus, the network 300 can improve system performance.

Figure 4A:
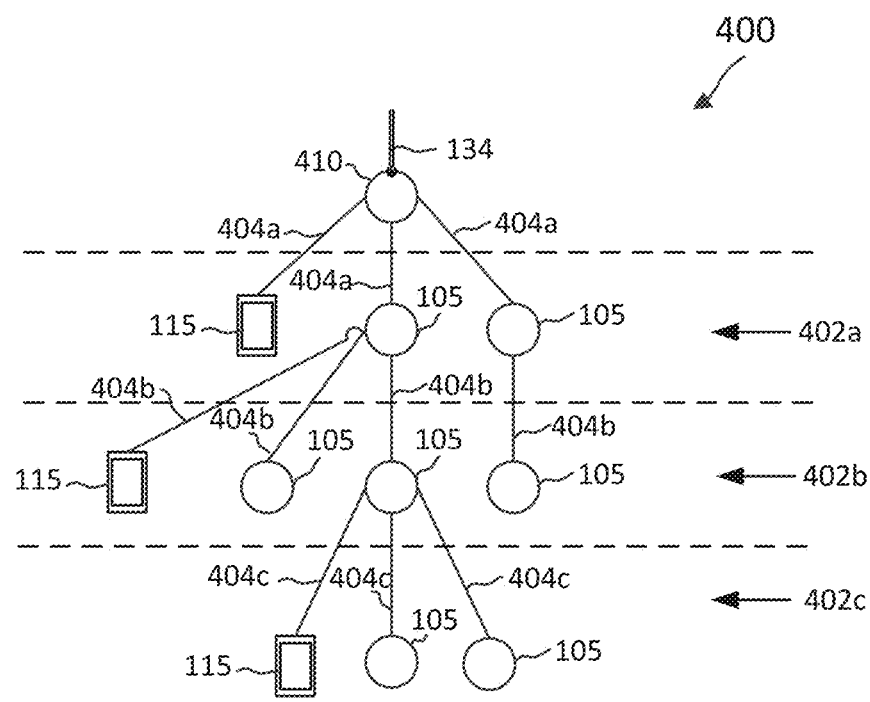
FIGS. 4A-4B illustrate an IAB network topology according to aspects of the present disclosure.
Figure 4B:
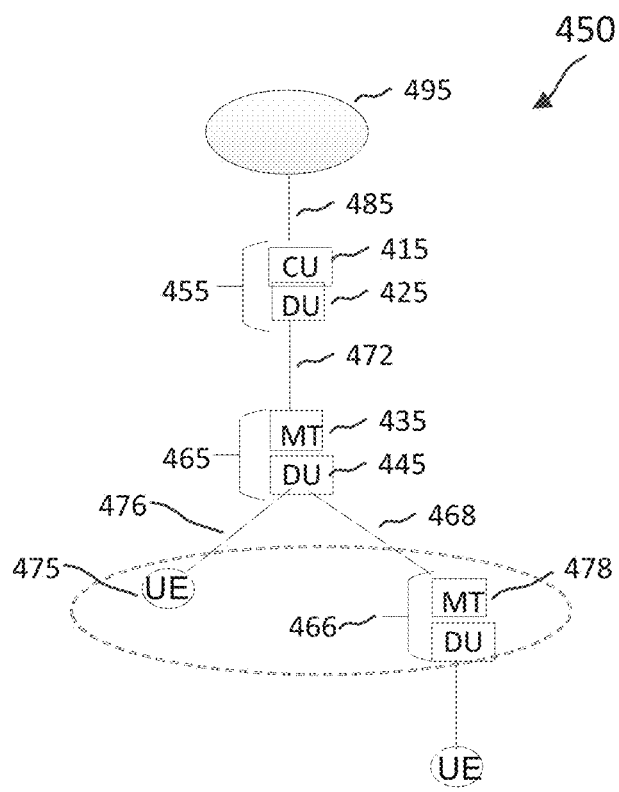

FIGS. 4A-4B illustrate an IAB network topology 400 according to aspects of the present disclosure. The topology 400 can be employed by the networks 200 and 300. For example, the BSs 105 and the UEs 115 can be configured to form a logical spanning tree configuration as shown in the topology 400 for communicating access traffic and/or backhaul traffic. The topology 400 may include an anchor 410 coupled to an optical fiber link 134 for communication with a core network (e.g., the core network 130). The anchor 410 may correspond to the BS 105c in the networks 200 and 300. The anchor 410 may also be known as an IAB donor and may include the function of controlling the IAB network topology 400 through configurations as well as the function of scheduling the communications of child IAB nodes or UEs (i.e., the IAB nodes or UEs directly linked to it via links 404). In some aspects, the anchor or IAB donor 410 includes a central unit (CU) that performs the former functions and a distributed unit (DU) that performs the latter functions. The CU can be a logical node hosting radio resource control (RRC), service data adaptation protocol (SDAP) and packet data convergence protocol (PDCP) of the anchor or IAB donor while the DU can be a logical node hosting radio link control (RLC), medium access control (MAC) and physical (PHY) layers of the anchor or IAB donor 410. The CU and the DU may be connected via an F1 interface, the application protocol (F1-AP) of which can be used for conveying the lower-layer configuration information of the radio bearers between the CU and DU, as well as for setting up of a General Packet Radio Services (GPRS) tunneling protocol (GTP) tunnel between the DU and CU for each radio bearer.

The topology 400 includes a plurality of logical levels 402. In the example of FIG. 4, the topology 400 includes three levels 402, shown as 402a, 402b, and 402c. In some other aspects, the topology 400 can include any suitable number of levels 402 (e.g., two, three, four, five, or six). Each level 402 may include a combination of UEs 115 and BSs 105 interconnected by logical links 404, shown as 404a, 404b, and 404c. For example, a logical link 404 between a BS 105 and a UE 115 may correspond to a wireless access link 125, whereas a logical link 404 between two BSs 105 may correspond to a wireless backhaul link 234. The BSs 105 and the UEs 115 may be referred to as relay nodes in the topology 400.

The IAB nodes (e.g., the BSs 105) in the level 402a can function as relays for the nodes in the level 402b, for example, to relay backhaul traffic between the IAB nodes and the anchor 410. Similarly, the IAB nodes (e.g., the BSs 105) in the level 402b can function as relays for the nodes in the level 402c. For example, the IAB nodes in the level 402a are parent nodes to the nodes in the level 402b, and the IAB nodes in the level 402c are child nodes to the nodes in level 402b. The parent nodes may function as access functionality (ACF)-nodes and the child nodes may function as user equipment functionality (UEF)-nodes. A parent node (e.g., an IAB donor, an anchor node, or a non-anchor IAB node) may have some control over resources of a child node (e.g., a non-anchor node or a UE) associated with the parent node.

For example, a BS 105 may implement both ACF and UEF and may function as an ACF-node and an UEF-node depending on which node the BS is communicating with. For example, a BS 105 in the level 402b may function as an access node when communicating with a BS 105 or a UE 115 in the level 402c. Alternatively, the BS 105 may function as a UE when communicating with a BS 105 in the level 402a. When a communication is with a node in a higher level or with a less number of hops to the anchor 410, the communication is referred to as a UL communication. When a communication is with a node in a lower level or with a greater number of hops to the anchor 410, the communication is referred to as a DL communication. In some embodiments, the anchor 410 may allocate resources for the links 404.

FIG. 4B shows an example IAB network with a network core 495 linked via a wireline fiber 485 to an IAB donor 455 including a CU 415 and a DU 425. The entity or node of an IAB node 465 that functions as the ACF-node of the IAB node may be referred to as the DU 445 of the IAB node 465 and the entity or node of an IAB node 465 that functions as the UEF-node of the IAB node may be referred as the mobile termination (MT) 435 of the IAB node 465. The MT 435 of an IAB node 465 can be a scheduled node (e.g., similar to a UE) with its communications scheduled by the parent IAB-node 455 (i.e., the communications of MT 435 can be scheduled by its parent DU 425 of its parent IAB 455) or the IAB-donor (i.e., the anchor 410) and the DU 425 of an IAB node 455 can be a scheduling node that schedules the communications of child IAB node 465 (e.g., schedule its child MT 435 of the child IAB node 465) of that IAB node 465. In some cases, a DU 445 of a IAB node 465 may also schedule or control a UE 475.

Figure 5C:
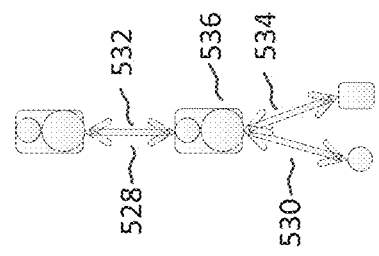
FIGS. 5A-5C illustrate duplex capabilities of an IAB node according to aspects of the present disclosure.
Figure 5B:
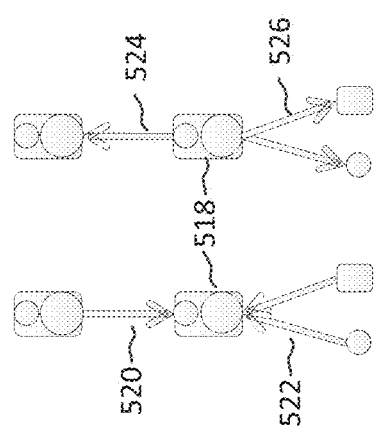
Figure 5A:
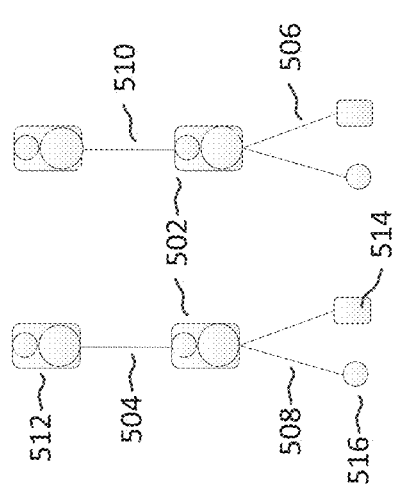

FIGS. 5A-5C illustrate duplex capabilities of an IAB node according to aspects of the present disclosure. In some aspects, IAB nodes (e.g., such as IAB nodes 105 or 465) of an IAB network can support duplex capabilities, i.e., the radio or communication resources of an IAB node may be orthogonally partitioned between the access links and the backhaul links of the IAB node according to the multiplex capabilities of the IAB node, which include partitioning the radio or communication resources of the node in time (i.e., time division multiplexing (TDM) capabilities), in frequency (i.e., frequency division multiplexing (FDM) capabilities), and in space (i.e., space division multiplexing (SDM) capabilities).

In some aspects, the IAB nodes can operate in-band, i.e., the DU and MT of the IAB node may operate or communicate using the same carrier frequencies. In some of such cases, however, the MT of a IAB node may not be configured to receive a communication when the DU of the same IAB node is transmitting, and vice versa. In other words, the IAB node may be half-duplex constrained, and a time-domain separation may be instituted between the operations of the MT and the DU of the IAB node. FIG. 5A shows an example schematic illustration of a IAB node 502 where the resources of the IAB node 502 are partitioned in time (i.e., using TDM capabilities of the IAB node) between the IAB node's backhaul links 504 and the access or child links 506. It is to be noted that when the backhaul links between the MT of the IAB node 502 and its parent DU (i.e., the DU of its parent IAB node 512) is active (504) or inactive (510), the access or child links between the DU of the IAB node 502 and the child MT (i.e., the MT of its child IAB node 514) or a UE 516 may be inactive (508) or inactive (506), respectively. In other words, the radio resources of the IAB node may be partitioned in time between the backhaul links (504 or 510) and the access links (506 or 508) during in-band operations of the IAB node 502.

In some aspects where the IAB node can be half-duplex constrained, a space-domain separation may be instituted between the operations of the MT and the DU of the IAB node, i.e., the resources of the IAB node may be partitioned in space according to the SDM capabilities of the IAB node. FIG. 5B shows an example schematic illustration of a IAB node 518 where the resources of the IAB node 518 are partitioned in space (i.e., using SDM capabilities of the IAB node) and the IAB node's backhaul links and access or child links are engaged simultaneously in signal reception RX (e.g., 520 and 522) or signal transmission TX (e.g., 524 and 526). That is, the DU and MT of the IAB node 518 can engage in simultaneous reception RX via the backhaul link 520 and the access link 522, or can engage in simultaneous transmission TX via the backhaul link 524 and the access link 526. FIG. 5C shows an example schematic illustration of a IAB node 536 where the resources of the IAB node 536 are partitioned in space (i.e., using SDM capabilities of the IAB node), and the IAB node's backhaul links and access or child links can be engaged simultaneously in both signal reception (e.g., 528 and 530) and signal transmission (e.g., 532 and 534).

Figure 6A:
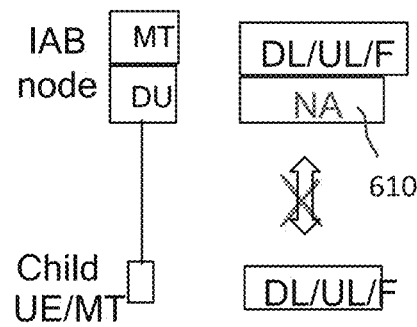
FIGS. 6A-6C illustrate operations of an IAB node based on the resource types of the IAB node according to aspects of the present disclosure.
Figure 6B:
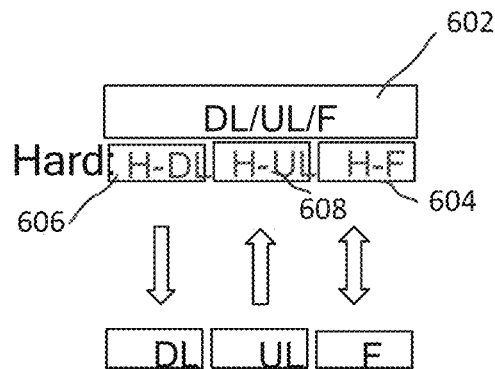
Figure 6C:
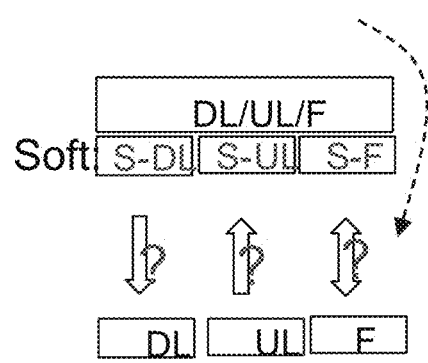

FIGS. 6A-6C illustrate operations of an IAB node based on the resource types of the IAB node according to aspects of the present disclosure. As noted above with reference to FIG. 5A, when a IAB node is half-duplex constrained, TDM of the resources of the IAB nodes may be employed to facilitate communication between neighboring IABs. The DU and/or MT time-domain resources of a IAB node can be configured as uplink (UL), downlink (DL) and flexible (F) to indicate the allowed transmission directions for that resource type (DU or MT). Due to the half-duplex constraint, however, a MT resource's configuration may not necessarily indicate that the MT is available in the configured transmission direction, since the availability of a MT resource can depend on the configuration of the corresponding DU resource. The availabilities of the DU and MT resources can be coordinated by configuring the DU resources as hard (H), soft (S) and not available (NA), as discussed in the 3GPP standard document technical specification (TS) 38.873, titled "Study on Integrated Access and Backhaul (3GPP TS 38.873)", which is incorporated herein by reference in its entirety.

That is, in an IAB network, resources (such as time resources or another type of resource) may be configured as downlink-only, uplink-only, flexible, or not available (e.g., unavailable). When a resource is configured as downlink-only for an IAB node, that time resource may be available for only downlink communications of the IAB node, and not uplink communications. Similarly, when a time resource is configured as uplink-only for an IAB node, that resource may be available for only uplink communications of the IAB node, and not downlink communications. When a resource is configured as flexible for an IAB node, that resource may be available for both downlink communications and uplink communications of the IAB node. When a resource is configured as not available for an IAB-node DU, the resource may not be used for any communications by the IAB-node DU with its child IAB node. It should be noted that the techniques and apparatuses described herein for time resources can be applied for any type of resource (e.g., frequency resource, spatial resource, code resource, and/or the like).

Further, as noted above, resources in an IAB network that are configured as downlink-only, uplink-only, or flexible may be further configured as hard resources or soft resources. When a resource is configured as a hard resource for an IAB-node DU, in some aspects, the resource can be always available for communications by the IAB-node DU with its child IAB node. For example, a hard downlink-only resource can always be available for only downlink communications of the IAB node DU, a hard uplink-only resource can always be available for only uplink communications of the IAB node DU, and a hard flexible resource can always be available for uplink and downlink communications of the IAB node DU.

A hard DU configuration indicates that the DU resource is available for the DU in the configured transmission direction without the IAB node that includes the DU having to consider the impact of the availability on the resources of the corresponding MT (i.e., MT of the same IAB). That is, hard DU resources can indicate that the DU resources are available for transmission/reception (TX/RX) by the DU while the MT resources are unavailable regardless of the configurations of the MT resource. That is, when DU resources are configured as hard, it cannot be guaranteed that the MT can properly transmit or receive on these resources while the DU can use these resources regardless of the MT resource configurations. FIG. 6B shows a schematic illustration of hard DU resources configured for downlink (DL) 606, uplink (UL) 608 and flexible (F) 604 transmission by a DU of a IAB node may be available regardless of the configurations of the MT (e.g., 602) of the same IAB. A Not Available DU configuration, such as the example illustration shown in FIG. 6A, indicates that the N/A DU resource 610 may not be available for the DU, and as such, the DU cannot assume or expect the resource to be available for its TX/RX. A MT's or UE's resource configuration for TX/RX may be scheduled by a parent IAB node or via an radio resource control (RRC) configuration message from the control unit (CU) of the IAB-donor (of the IAB network of which the IAB is a part).

When a resource is configured as a soft resource for an IAB node DU, the availability of that resource can be controlled by a parent node of the IAB node. For example, the parent node may indicate (e.g., explicitly or implicitly) whether a soft resource is available for communications of the IAB node DU. Thus, a soft resource may be in one of two states: an available state (e.g., when the soft resource can be available for scheduling and/or communications of the IAB node DU) and a non-available state (e.g., when the soft resource may not be available for scheduling and may not be available for communications of the IAB node DU).

For example, a soft downlink-only resource is only available for downlink communications of the IAB node when a parent node of the IAB node indicates that the soft downlink-only resource is available. Similarly, a soft uplink-only resource is only available for uplink communications of the IAB node when a parent node of the IAB node indicates that the soft uplink-only resource is available. A soft flexible resource is only available for uplink and downlink communications of the IAB node when a parent node of the IAB node indicates that the soft flexible resource is available.

As discussed above, a soft DU configuration can come in two states, a available state and a non-available state. An available state is where the IAB node has indication from its parent IAB node that the DU resource configured as available has been indicated, explicitly or implicitly, as available. For example, a parent IAB node may indicate, via a downlink control information (DCI) transmission (e.g., such as DCI2_5 message), that the DU resource is available for transmission by the DU. A non-available state is where the IAB node has no indication from its parent IAB node that the DU resource configured as non-available has been indicated, explicitly or implicitly, as available. For example, the IAB node may have no indication from its parent IAB that the DU resource is available for transmission by the DU. FIG. 6C shows a schematic illustration of soft DU resources configured for downlink (DL), uplink (UL) and flexible (F) direction transmission by a DU of a IAB node, the availabilities of which can be controlled by a parent node of the IAB node (or IAB-donor of the IAB network that includes the IAB node).

In some aspects, an available DU resource may be considered as a hard DU resource, and a non-available resource may be considered as a N/A DU resource. In yet some aspects, a soft DU resource may indicate that the soft DU resource can be used by the DU if that does not impact the MT's ability to transmit and/or receive according to the MT's configuration and scheduling. For example, a DU resource may be configured as soft DU. In such example, if a MT resource is configured as uplink but there is no uplink data for the MT to transmit or the MT does not have a valid uplink scheduling grant, the DU can use the soft DU resource for TX/RX. In other words, a DU can use a soft DU configured resource provided the DU's use is not impacting the MT's TX/RX.

As discussed above, a IAB network includes multiple IAB nodes (e.g., BSs) communicating with each other, either directly or indirectly (e.g., through the core network of the IAB network), over backhaul links and UEs communicating with the IAB nodes via access links (e.g., wireless access links). These communications can use NR technology, designed to operate across different spectrum types, from licensed spectrum to unlicensed and shared spectrum. The operations or deployments of NR in an unlicensed spectrum is referred to as NR-U. One approach to avoiding collisions when communicating in a shared spectrum or an unlicensed spectrum is to use a listen-before-talk (LBT) channel access procedure to ensure that the shared channel is clear before transmitting a signal in the shared channel. FIGS. 7A-7D illustrate such channel access procedures for NR-U according to aspects of the present disclosure.

Figure 7A:
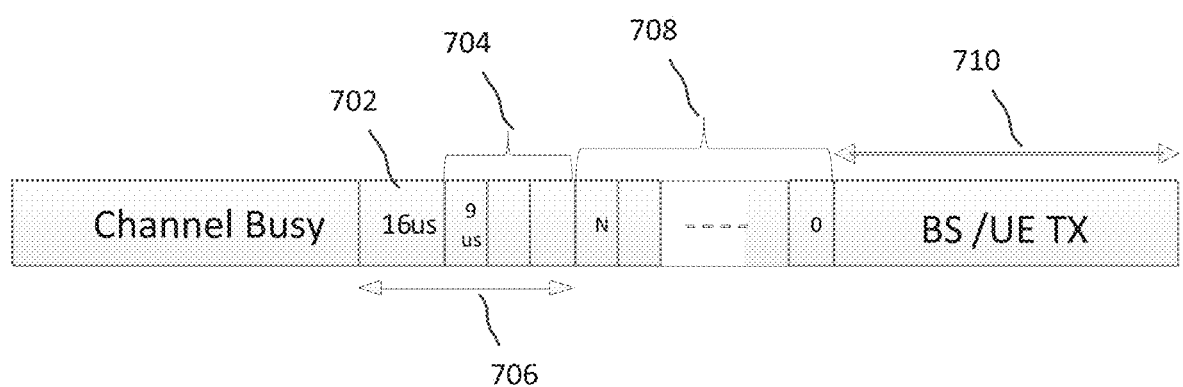

FIG. 7A shows an example schematic illustration of a type 1 LBT channel access procedure according to some aspects of the present disclosure. LBT refers to spectrum sharing mechanism by which a device (e.g., an IAB node) senses the channel using a clear channel assessment (CCA) check before accessing to it. Type 1 channel access procedure refers to an LBT with random back-off with a contention window of fixed size, in which the extended CCA period is drawn by a random number within a fixed contention window. For example, with reference to FIG. 7A, a device such as an IAB node initiating a transmission may initially wait for the channel to be idle for 16 μs (e.g., 702), and the device may determine that the channel is idle if the device does not detect energy in the channel above some energy detection threshold level (e.g., between −75 and −85 dBm/MHz). Upon determining that the channel has been idle for 16 μs, the device may then proceed to perform a CCA after each of the m required observation or sensing slots 704 (e.g., shown for m=3 in FIG. 7A), where each slot lasts at least 9 μs. A successful CCA decrements m by 1, whereas channel occupancy resets m. Once m reaches 0, i.e., after a defer period 706 that includes the idle period of 16 μs and the duration for the observation slots 704, the device can proceed to the backoff stage. For the backoff stage, the device can select a random whole number N in {0, . . . , CW}, where CW is the contention window. CCA may then be performed for each observation slot and can result either in decrementing N by 1 (e.g., 708) or freezing the backoff procedure. Once N reaches 0, a transmission 710 may commence. The length of the transmission 710, i.e., the channel occupancy time (COT) for the device, can be upper bounded by a maximum channel occupancy time (MCOT $T_{mcot}$) (e.g., no greater than 10 ms) which can vary based on the priority class of the transmission. A transmission with a lower or higher priority class number may have a higher or lower chance of acquiring a channel because the contention window (CW) has shorter or longer duration, respectively. If the transmission is successful, the responding device may send an immediate acknowledgement (e.g., without a CCA) and reset CW to the minimum value of CW, $CW_{min}$. If the transmission fails, the CW value may be doubled (up to the maximum value of CW, $CW_{max}$) at the transmission initiating device before the next retransmission. FIG. 7B shows a table of the values of the number of observation or sensing slots $m_p$, $CW_{min,p}$, $CW_{max,p}$, $T_{mcot}$ and allowed $CW_p$ sizes for channel access priority class p. Classes with higher priority can have lower m and lower {CWmin, CWmax} and this higher priority in channel access can be offset by $T_{mcot}$, where the lower priority classes can transmit for longer in a single burst. The higher priority classes can transmit for shorter periods as the packet sizes can be shorter and have multiple bursts for higher-priority transmissions.

Figure 7C:
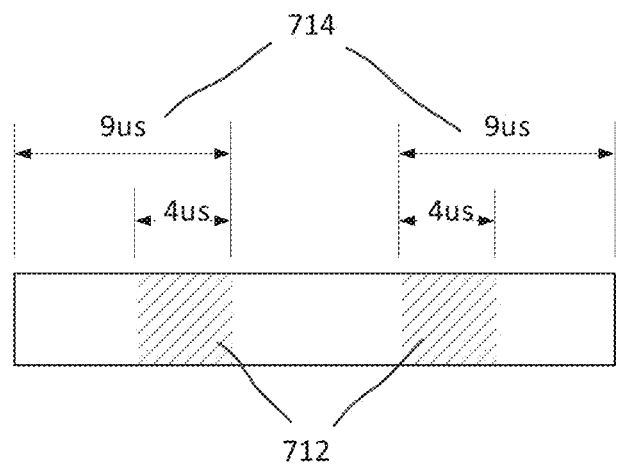
Figure 7D:
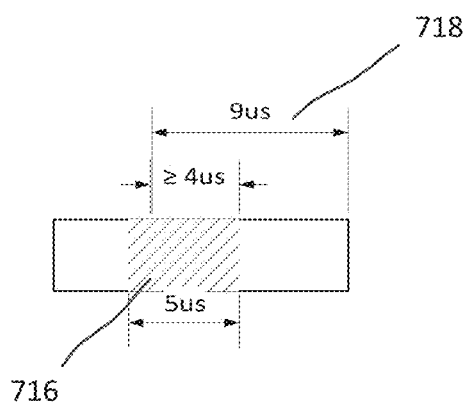

FIGS. 7C-7D show example schematic illustrations of type 2 LBT channel access procedures according to some aspects of the present disclosure. Type 2 channel access procedures refer to LBT with no random back-off but rather deterministic CCA or channel sensing period. FIG. 7C shows example schematic illustration of type 2A LBT channel access procedure according to some aspects of the present disclosure. Type 2A refers to a channel access procedure with a deterministic channel sensing period of 25 µs for when the gap between a UL physical uplink shared channel (PUSCH) transmission grant being transmitted in a DL direction and the UL PUSCH transmission start time may be 25 µs or more (e.g., can be as long as several ms). The channel sensing period is 25 µs when the gap between an UL transmission and a DL transmission is exactly 25 µs, and in some respects, the channel access procedure is a type 2A channel access procedure only when the transmission gap is exactly equal to 25 microseconds. Channel sensing 712 may occur for at least 4 µs within a 9 µs period 714 of the gap. Type 2B channel access procedure refers to a channel access procedure with a deterministic channel sensing period of 16 µs, i.e., a 16 µs sensing period is required before a transmission can commence, and can be applicable for when the gap between an UL transmission and a DL transmission, between an UL transmission and an UL transmission, between a DL transmission and an UL transmission, or between a DL transmission and a DL transmission is equal to 16 µs. Type 2C channel access procedure refers to a channel access procedure where no sensing is required (e.g., channel sensing period=0) before a transmission when the gap between an UL transmission and a DL transmission, between an UL transmission and an UL transmission, between a DL transmission and an UL transmission, or between a DL transmission and a DL transmission is less than or equal to 16 µs. Channel sensing 716 may occur for at least 4 µs within a 9 µs period 718 of the gap. An example illustration of a listen-before-talk (LBT) channel access procedure is shown in FIG. 7E.

Figure 7E:
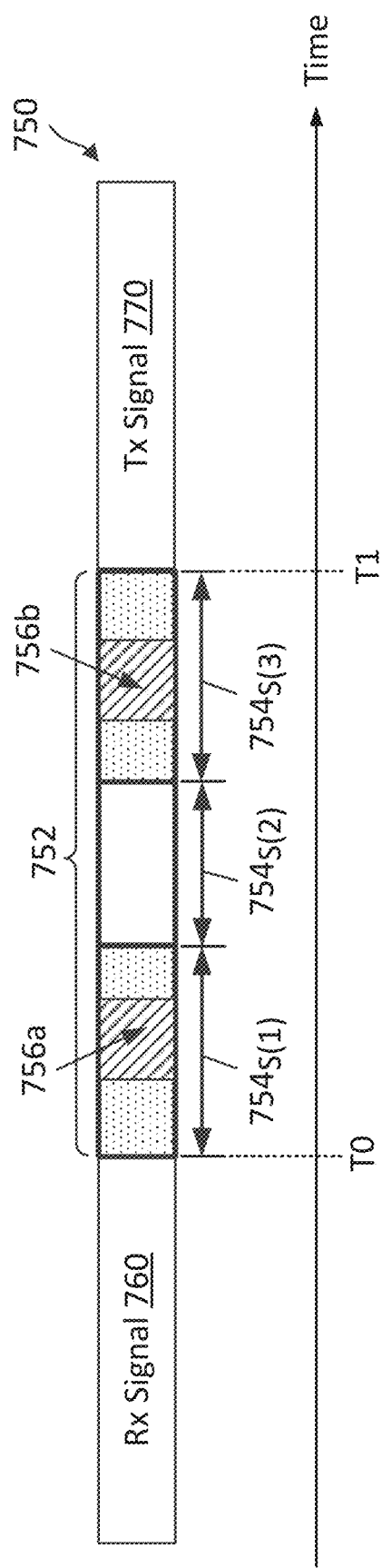

FIG. 7E shows a timing diagram illustrating a listen-before-talk (LBT) channel access procedure according to some aspects of the present disclosure. The scheme 750 may be employed by a BS such as the BSs 105 and a UE such as the UEs 115 in a network such as the network 100. In particular, a BS or a UE may employ scheme 750 to determine measurement periods within a link switch duration for LBT measurements. In FIG. 7E, the x-axis represents time in some constant units. As an example, a wireless communication device (e.g., a BS or a UE) receives a communication signal 760 (shown as Rx signal) and completes the reception at time T0 in a certain link direction (e.g., UL or DL). After receiving the communication signal 760, the wireless communication device switches to another link direction (e.g., UL-to-DL or DL-to-UL) and transmits a communication signal 770 (shown as Tx signal) starting at time T1. In an example, the wireless communication device corresponds to a BS, the communication signal 760 is an UL communication signal (e.g., including PUSCH data and/or physical uplink control channel (PUCCH) control information transmitted by a UE), and the communication signal 770 corresponds to a discovery reference signal (DRS) (e.g., including synchronization signal blocks (SSBs)) or any DL communication signal including Physical Downlink Shared Channel (PDSCH) data and/or Physical downlink Control Channel (PDCCH) control information. In another example, the wireless communication device corresponds to a UE, the communication signal 760 is a DL communication signal (e.g., including PDSCH data and/or PDCCH control information transmitted by a BS), and the communication signal 770 corresponds to a scheduled UL transmission (e.g., including PUSCH data and/or PUCCH control information) in a COT acquired or reserved by the BS. The wireless communication device may perform a LBT channel access procedure (e.g., a type 2 LBT) prior to transmitting the communication signal 770.

It should be noted that in some instances the switching gap can be longer than the duration of the measurement period considered for LBT. For example, as discussed above, the time or gap between a UL PUSCH transmission grant being transmitted in a DL direction and the UL PUSCH transmission start time may be as long as several ms, but the LBT may be performed for just a fixed duration (e.g., about 25 µs) prior to the PUSCH transmission. It should be noted that in some instances such fixed duration LBT channel access procedures (type 2 LBT) may be used without any switch in direction. For example, for DRS transmission, a BS may use a fixed duration (e.g., about 25 µs) LBT just prior to the DRS transmission.

The scheme 750 time-partitions a link switch gap duration 752 between the received communication signal 760 and the scheduled or upcoming transmit communication signal 770 or more generally the type 2 LBT duration into about three slots 754 (shown as 754$_{S(1)}$, 754$_{S(2)}$, and 754$_{S(3)}$). In an example, the link switch gap duration 752 may be about 25 µs, the slot 754$_{S(1)}$ may have a duration of about 9 µs, the slot 754$_{S(2)}$ may have a duration of about 7 µs, and the slot 754$_{S(3)}$ may have a duration of about 9 µs. The scheme 750 allows LBT measurements during the slots 754$_{S(1)}$ and 754$_{S(3)}$, but not during the slot 754$_{S(2)}$. Additionally, the scheme 750 requires an LBT measurement duration of at least 4 µs. LBT measurements may refer to energy detection or measurements.

In an example, the wireless communication device may determine whether the channel is available by performing energy detection during a measurement period 756*a* within the slot 754$_{S(1)}$ and during a measurement period 756*b* within the slot 754$_{S(3)}$. The wireless communication device measures channel energy for a duration of at least 4 µs to determine a channel status (e.g., idle or occupied). In other words, each of the measurement periods 756*a* and 756*b* may have a duration of at least 4 µs. The wireless communication device may select any 4 µs within the slots 754$_{S(1)}$ and 754$_{S(3)}$ for channel energy measurements and refrain from performing energy detection during the slot 754$_{S(2)}$. In some examples, the wireless communication device may perform energy detection in a beginning portion of the slot 754$_{S(1)}$ or the slot 754$_{S(3)}$ and use the remaining time of the corresponding slots 754 for processing the energy measurement. An LBT channel access procedure is a pass when the measurements in the measurement periods 756*a* and 756*b* are below a certain energy detection threshold. Conversely, an LBT channel access procedure fails when the measurement in the measurement period 756*a* or the measurement in the measurement period 756*b* is equal to or greater than the energy detection threshold.

Figure 8A:
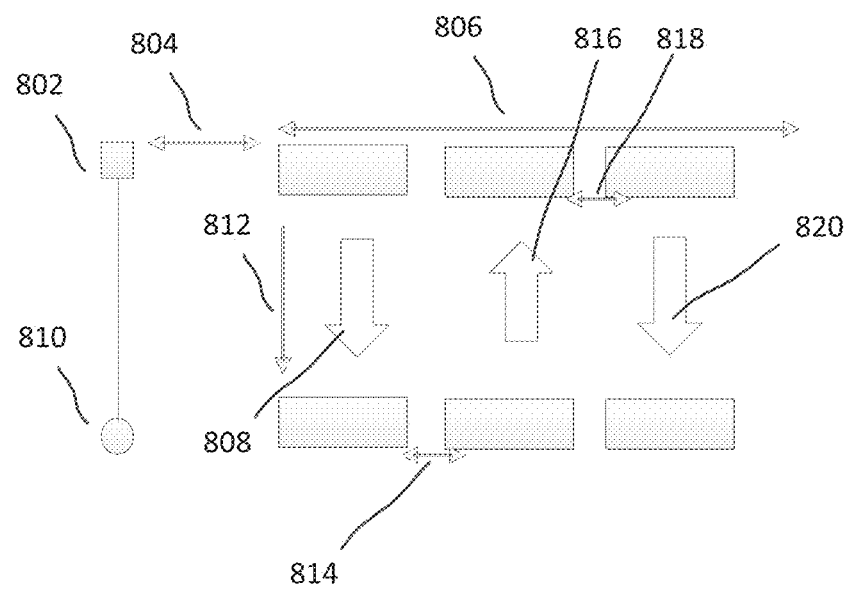
FIGS. 8A-8D illustrate channel occupancy time (COT) sharing between a next generation NodeB (gNB) and a user equipment (UE) according to aspects of the present disclosure.

As noted above, a device such as a BS may perform a channel access procedure (e.g., type 1 LBT channel access procedure) to acquire or reserve a COT for a channel in an unlicensed 5G spectrum for signal transmission to a UE. In some cases, the COT may be longer than what is needed for transmission by the BS and the BS may share the COT with the UE so that the UE may use part of the COT for signal transmission back to the BS. When sharing the COT in a channel with the UE, in some aspects, the BS may explicitly indicate, via an UL scheduling grant, what kind of channel access procedure the UE must perform to be able to access the channel and use the COT for an UL transmission to the BS. For example, the BS may indicate to the UE, via the UL scheduling grant, the type of channel access procedure the UE may perform to access the channel within the COT depending on the gap between the DL transmission from the BS and the UL transmission by the UE, i.e., depending on which condition of the type 1 or type 2 channel access procedures that the gap meets. For example, the BS may indicate to the UE to perform type 2A, type 2B or type 2C channel access procedure if the gap is 25 μs, 16 μs or less than or equal to 16 μs, respectively. In some cases, when the UL scheduling grant indicates to the UE that the UE should perform type 1 channel access procedure, the UE may still perform (e.g., autonomously despite the indication from the BS) a type 2 procedure (e.g., type 2A) provided that the time gap conditions for the type 2 procedure are met. The UE may determine the conditions are met based on the remaining COT indicated as being available in the DCI transmission (e.g., DCI2_0 message) by the BS to the UE. FIG. 8A shows an example schematic illustration of a COT initiated by a BS and shared with a UE. A BS 802 may perform a type 1 channel access procedure to acquire a COT 806 that is no greater in duration than the sum of MCOT ($T_{mcot}$) and $T_g$, and the BS 802 may use some of the COT 806 for a DL transmission 808 to the UE 810. In some aspects, $T_g$ can be the total duration of all gaps of duration greater than 25 μs that can occur between the DL transmission of the BS and UL transmissions scheduled by the BS, and between any two UL transmissions scheduled by the BS starting from $t_o$, where $t_o$ is the time instance where BS has started transmission. The DL transmission 808 may also include a DCI transmission 812 (e.g., DCI 2_0 message) indicating the COT remaining after the DL transmission 808 by the BS 802. Based on the information in the DCI2_0 message 812 indicating the remaining amount of COT, the UE 810 perform a type 1 or type 2 channel access procedure 814 for an UL transmission 816 to the BS 802. As mentioned above, the UE 810 may autonomously switch to a type 2 procedure despite the DCI2_0 message indicating a type 1 procedure provided that the conditions for a type 2 procedure are fulfilled by the remaining COT. In some cases, there may still be available COT left after the UL transmission 816 by the UE 810, and the BS 802 may perform type 2 channel access procedure 818 to access this available COT for additional DL transmission 820. In FIG. 8A, the x-axis represents time in some arbitrary units.

Figure 8B:
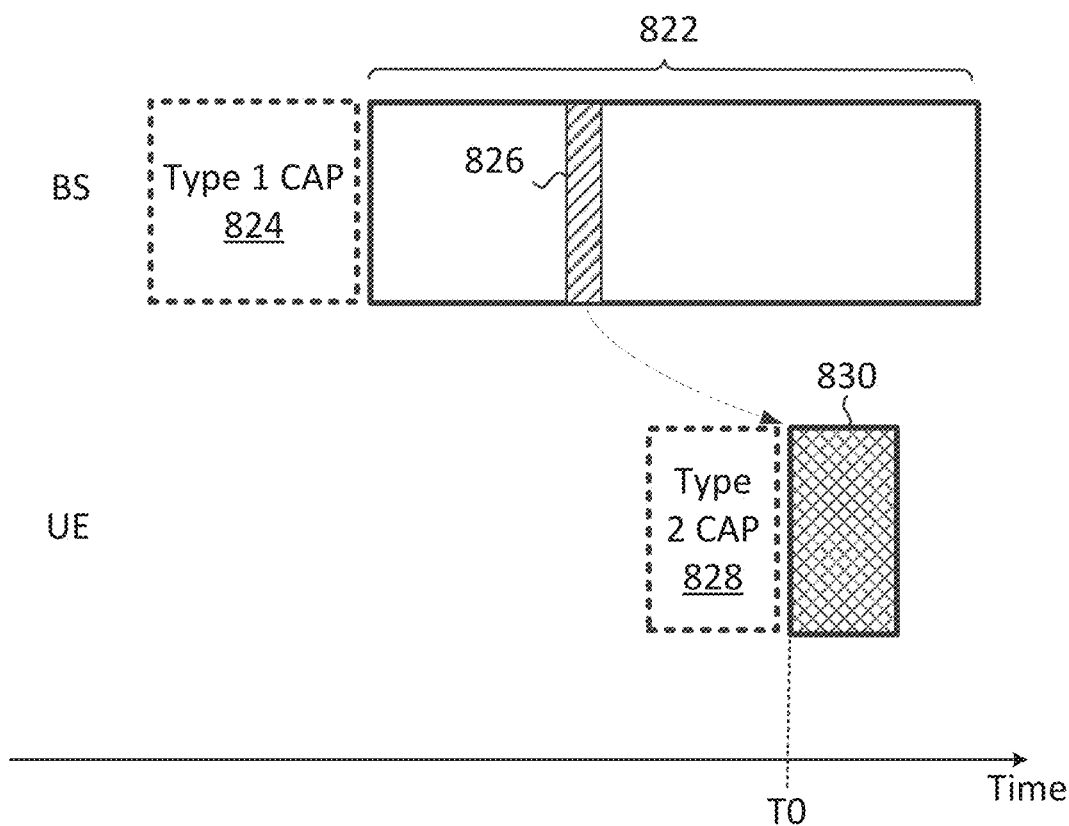

FIG. 8B is a timing diagram illustrating the sharing of a BS initiated COT between the BS and a UE according to some aspects of the present disclosure. The COT sharing may be initiated by BSs such as the BSs 105 for COT sharing with UEs such as the UEs 115 in a network such as the network 100. In FIG. 8B, the x-axis represents time in some arbitrary units.

In some aspects, a BS (e.g., BS 105 in FIG. 1) contends for a COT 822 by performing a type 1 channel access procedure (CAP) 824 in a shared channel. Upon passing the type 1 CAP 824, the COT 822 may begin. The BS may schedule the UE for UL and/or DL communications during the COT 822. As shown, the BS transmits a UL scheduling grant 826 to schedule the UE for a UL communication at a time T0 within the COT 822. The scheduling grant 826 may indicate resources (e.g., time-frequency resources) allocated for the UL communication and/or transmission parameters for the UL communication. Upon receiving the UL scheduling grant 826, the UE performs a type 2 procedure 828 prior to the scheduled time T0. A type 2 procedure may be referred to as channel access procedure without a random backoff. A type 2 procedure may also be referred to as a one-shot LBT. At time T0, upon passing the type 2 CAP 828, the UE transmits a UL communication signal 830 based on the UL scheduling grant 826. The UL communication signal 830 can include UL data and/or UL control information. In an example, the UL data may be carried in a PUSCH and the UL control information may be carried in a PUCCH. The UL control information may include scheduling request, channel information (e.g., CSI reports), and/or hybrid automatic repeat request (HARQ) acknowledgement/negative-acknowledgement (ACK/NACK) feedbacks.

In some aspects, the COT may initially be initiated or acquired by the UE as part of a UL transmission to the BS and may be shared with the BS for a DL transmission by the BS to the UE. For example, the UE may initiate a COT in a channel of an unlicensed 5G spectrum by performing a type 1 channel access procedure and use some of the COT for an UL transmission, and share the remaining COT with the BS for an UL transmission by the UE to the UE. In such cases, the BS may autonomously determine what type of channel access procedure to perform to access the COT. This is because, since DL/UL communications between the BS and the UE are controlled by the BS, the BS may have information about remaining COT. That is, if the COT is initiated by the UE because of an UL transmission scheduled by a dynamic DCI grant from the BS, then the BS can indicate the channel access priority class in the UL for the UE's use in performing a type 1 channel access procedure and the BS can determine the maximum COT according to the priority class (and, for example, determine the remaining COT based on the maximum COT since the BS controls the UE's UL communication with the BS). If, on the other hand, the UE's COT is initiated by the UE because of a UL transmission configured by a RRC-configured grant, then the UE can communicate information related to the remaining COT via a configured grant (CG)-uplink control information (UCI) message. For semi-static UL transmissions such as physical random access channel (PRACH) transmissions, physical uplink control channel (PUCCH) transmissions, sounding reference signals (SRSs), etc., the channel access priority class can be pre-defined (e.g., in a specification).

Figure 8C:
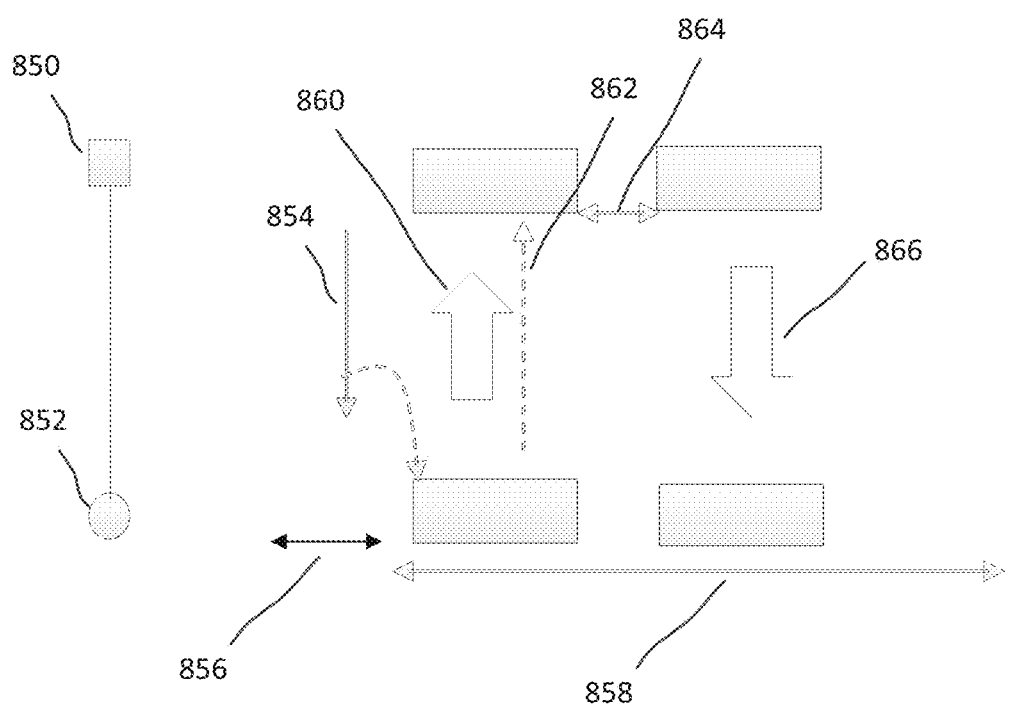

FIG. 8C shows an example schematic illustration of a COT initiated by a UE and shared with a BS. Following an UL scheduling grant 854 from the BS 850 to the UE 852, the UE 852 may perform a type 1 channel access procedure 856 to acquire a COT 806 that is no greater in duration than the MCOT ($T_{mcot}$), and the UE 852 may use some of the COT 858 for a UL transmission 860 to the BS 850. The UL transmission 860 may also include a GC-UCI 862 indicating the COT remaining after the UL transmission 860 by the UE 852. Based on the information in the GC-UCI 862 indicating the remaining amount of COT, the BS 850 may perform a type 2 channel access procedure 864 for a DL transmission 866 to the UE 852. In FIG. 8C, the x-axis represents time in some arbitrary units.

Figure 8D:
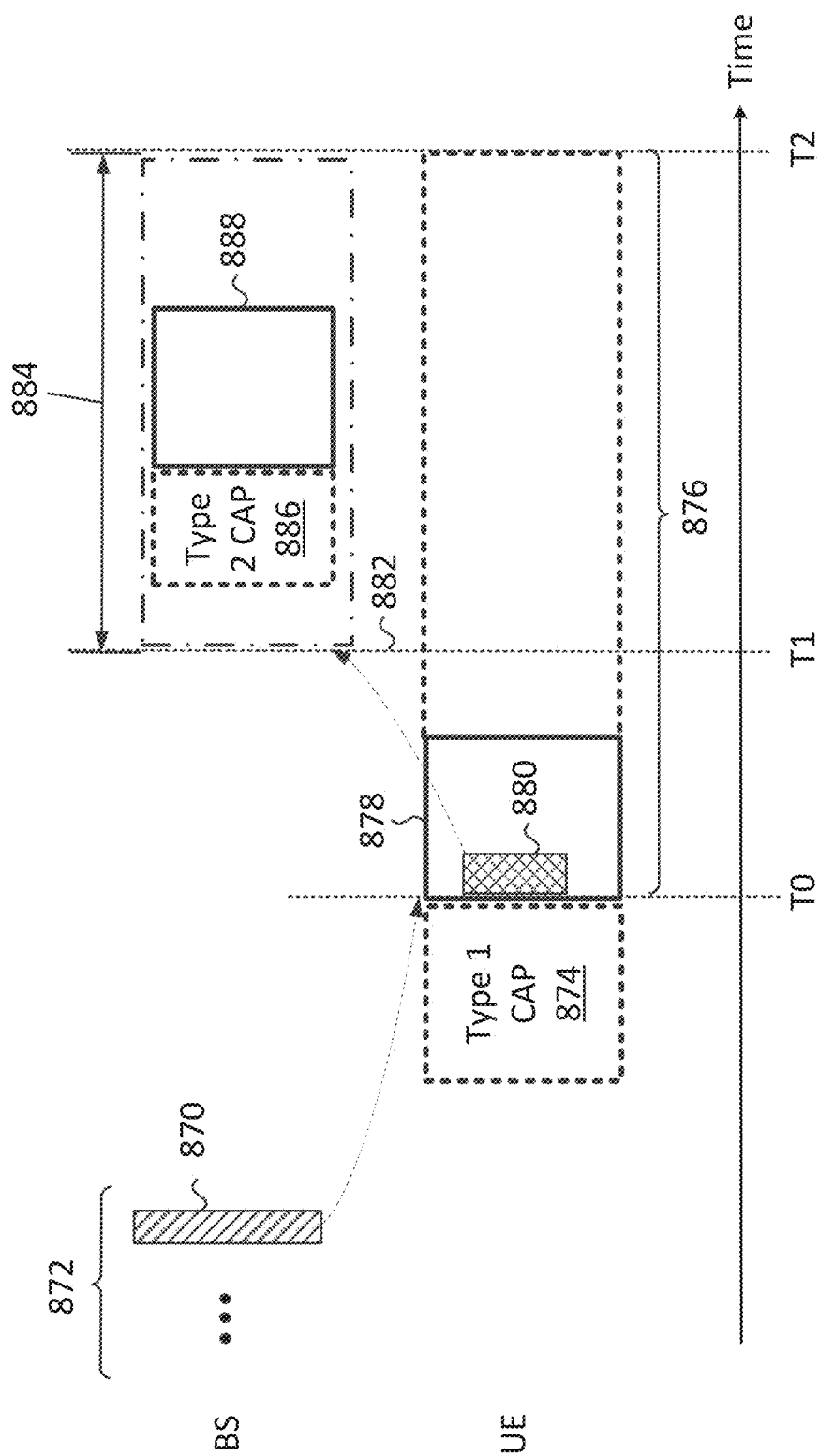

FIG. 8D is a timing diagram illustrating the sharing of a BS initiated COT between the BS and a UE according to some aspects of the present disclosure. The COT may be initiated by the UEs such as the UEs 115 for sharing with the BSs such as the BSs 105 in a network such as the network 100. A UE may initiate a COT based on an UL schedule received from a BS and share the COT with the BS for DL communication. The BS and the UE may use substantially similar channel access procedures mechanisms as described above. In FIG. 8D, the x-axis represent time in some arbitrary units.

In FIG. 8D, the BS transmits a UL scheduling grant 870 in the COT 872 to schedule the UE for a UL transmission at a time T0 outside of the BS's COT 872. The UE performs a type 1 CAP 874 prior to the scheduled time T0. Upon passing the CAP 874, the UE gains a COT 876 and transmits a UL communication signal 878 beginning at the scheduled time T0 according to the UL scheduling grant 870. The COT 876 may include a duration longer than the transmission duration of the UL communication signal 878. For example, the COT 876 may end at time T2 based on a contention window length used for performing the type 1 CAP 874.

Accordingly, the UE may share the COT 876 with the BS for DL communication. In an aspect, the UE includes COT sharing information 880 in the UL communication signal 878. The COT sharing information 880 may indicate that the BS is allowed to share the UE's COT 876 for communication. The COT sharing information 880 may indicate a sharable portion of the UE's COT 876 starting at a time 882 (e.g., at time T1) with a duration 884 as shown by the dashed-dotted box. In the context 5G or NR, the UL communication signal 878 may be a PUSCH signal and the COT sharing information 880 may be a PUCCH signal or a UL control information (UCI) message (e.g., CG-UCI). Upon receiving the COT sharing information 880, the BS performs a type 2 CAP 886 and transmits a DL communication signal 888 during a period within the sharable duration 884. The DL communication signal 888 may include DL control information (e.g., DL scheduling grants) and/or DL data.

The use and sharing of a COT as discussed above, whether initiated by a UE or a BS, may follow certain rules. For example, a BS may be allowed to use a COT the BS initiated or acquired for DL/UL communications with a UE for other DL/UL communications related to the BS (e.g., for DL/UL communications with another UE that the BS is connected to). For instance, if the COT is initiated by BS for communication with a first UE, the BS can use the COT for communication with a second UE as long as the gap between the DL transmissions to the first UE and the second UE is no greater than 16 μs. As another example, a UE may be allowed to use a COT the UE initiated or acquired for DL/UL communications with a BS for other DL/UL communications related to the BS. For instance, if the COT is initiated by a UE, the UE can use the COT for communication with the serving BS as long as the gap between UL transmissions to the BS is no greater than 16 μs.

With respect to the sharing of a COT, a BS may share with a second UE what remains of a COT the BS initiated for communication with a first UE. That is, the BS may use the remaining COT to communicate with the second UE or share the remaining COT with the second UE so that the second UE can communicate with the BS (e.g., transmit a UL transmission). For a COT initiated by a UE, the UE can share the COT with a BS for the transmission by the BS back to the UE. In some cases, the BS may not be allowed to use the remaining (i.e., shared by the UE) COT for communication with another UE.

The sharing of a COT in a channel of a 5G unlicensed spectrum as discussed above refers to a COT initiated or acquired by a BS or a UE that are linked to each other via an access link. The sharing of a COT in an IAB network (e.g., such as one shown in FIGS. 4A-4B) may, however, include additional features as an IAB network includes multiple IAB nodes (e.g., BSs) communicating with each other, either directly or indirectly, over backhaul links and communicating with UEs via access links. For example, with respect to FIG. 4B, the IAB network 450 includes an IAB node 465 linked to another IAB node 466 via a backhaul link 468 and to a UE 475 via an access link 476. Further, as discussed above, each IAB node may include a DU and an MT where the DU may serve as a parent DU node to a child MT of a child IAB node and the MT may serve as a child node to a parent DU of a parent IAB node. For example, IAB node 465 may include a DU 445 that functions as a parent DU node to the child MT 478 of the child IAB node 466 as well as a child MT node 435 that is a child MT to a parent DU node 425. In addition, due to the half-duplex constraint discussed above, an IAB node may or may not be available for communication based on its resource type. As such, COT sharing in an IAB network may depend on the functionality type of the IAB node (e.g., whether the COT is initiated or acquired for communication by the DU or the MT of the IAB node) and the resource type of the IAB node (e.g., whether the DU resource type is hard, soft, Not Available). Aspects of the present disclosure disclose the sharing of COT in an IAB network. The COT sharing is in accordance with the principle that a COT shared by an entity (e.g., an IAB node or a UE) is to be used by the receiving IAB node or UE for communication with the COT initiating IAB node or UE.

In some aspects of the present disclosure, a baseline approach for sharing a COT for a channel in a 5G unlicensed spectrum between a COT-initiating IAB node and a COT-receiving node (e.g., another IAB node or UE) is disclosed. The approach may comply with the principle that the receiving node use the shared COT for communication with the COT-initiating IAB node. For example, a COT initiated by a first IAB node that includes a DU that is a parent to a child MT of a second IAB node may share the COT with the child MT so that the child MT can communicate with the parent DU. As another example, a MT of an IAB node may initiate or acquire a COT and share the COT with a parent DU (i.e., a DU of a parent IAB) so that the parent DU can use the COT to communicate with the child MT.

For example, with reference to FIG. 4B, the baseline approach to COT sharing in an IAB network stipulates that a COT initiated by the IAB 465 for transmission by DU 445 of the IAB node 465 may be shared by DU 445 with its child MT 478 so that the child MT 478 can use the shared COT for communication with the parent DU 445. In another example, a COT initiated by IAB 465 for transmission by MT 435 of the IAB node 465 may be shared by MT 435 with its parent DU 425 so that the parent DU 425 can use the shared COT for communication with the child MT 435. In such cases, the discussions of FIGS. 8A-8D related to COT sharing between a BS and a UE apply equally to two parent and child IAB nodes of an IAB network with the DU of the parent IAB node (e.g., parent DU 445 of IAB 465) functioning as the BS (and more particularly, as the logical node hosting the RLC, MAC and PHY layers of the BS) and the MT of the child IAB node functioning as the UE. In such cases, the CU of the IAB donor may function as the logical node of a BS hosting RRC, SDAP and PDCP.

Figure 9A:
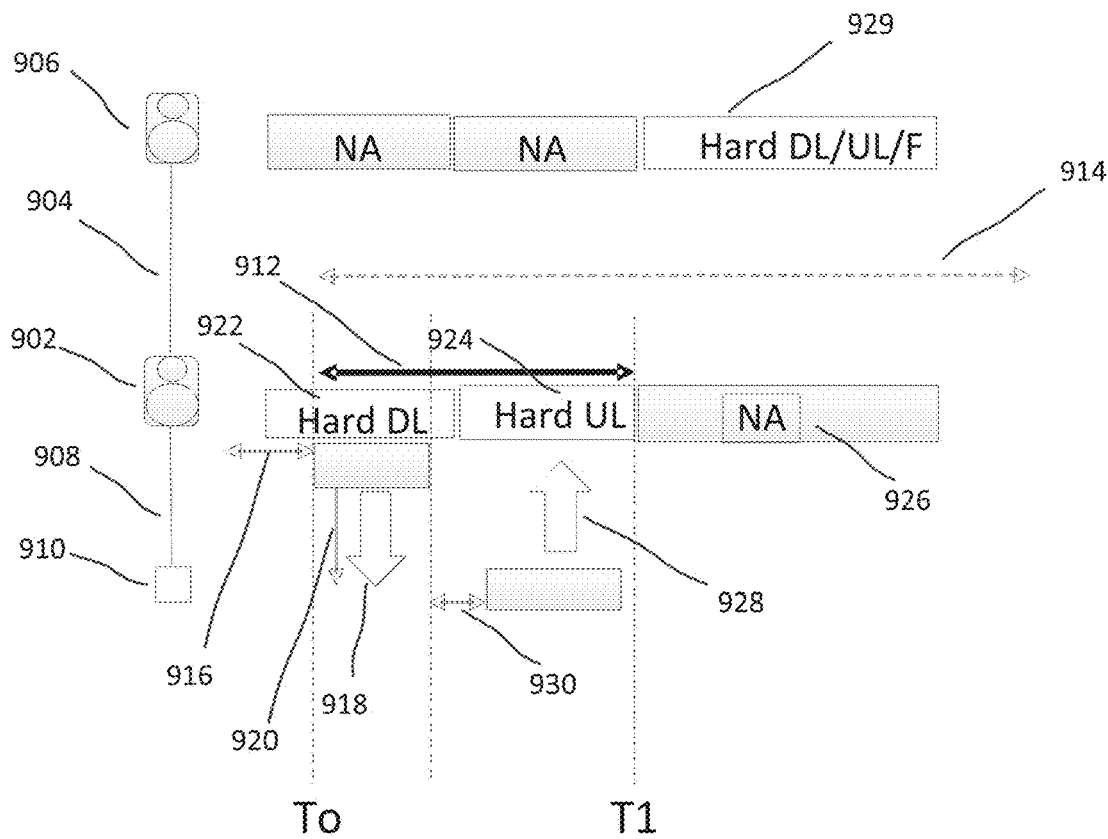
FIGS. 9A-9B illustrate COT sharing between IAB nodes in a baseline approach according to aspects of the present disclosure.
Figure 9B:
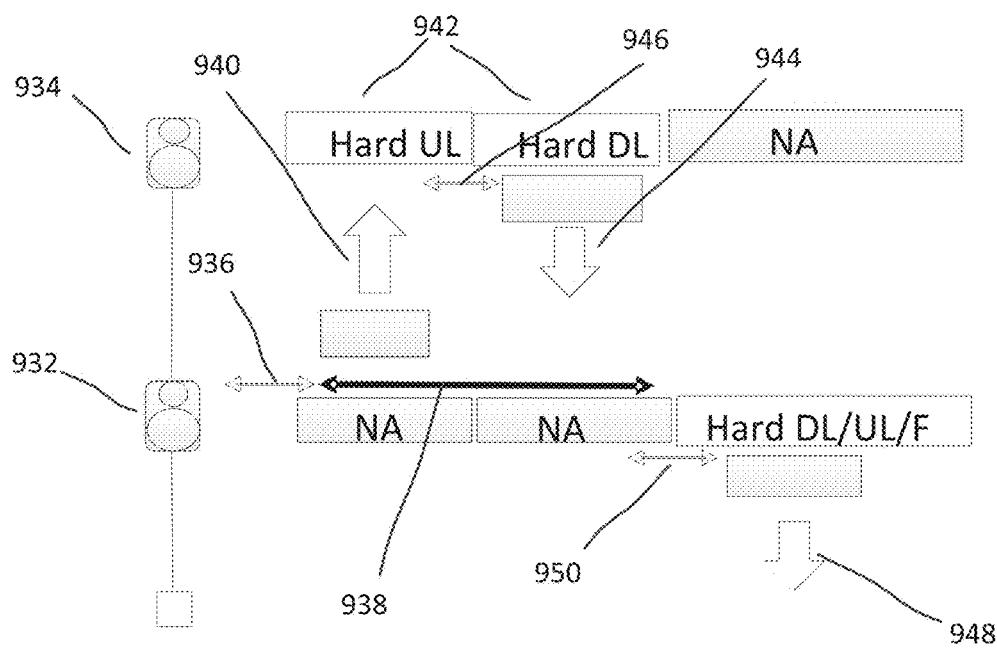

FIGS. 9A-9B show example illustration of COT sharing between IAB nodes in a baseline approach according to aspects of the present disclosure. In some aspects, with reference to FIG. 8A, an IAB node 902 connected to a parent IAB node 906 via a parent link 904 (e.g., backhaul link) and a child node (e.g., IAB node or UE) via a child link 908 (e.g., a backhaul link or an access link) may perform a type 1 channel access procedure 916 to acquire a COT 912 starting at time T$_o$ with a maximum COT MCOT 914 for transmission by the DU of the IAB node 902 to the child node 910 (i.e., a UE or child MT of IAB node 910). In some aspects, the DU of the IAB node 902 may have one or more resource configuration during the MCOT 914. For example, FIG. 9A shows that the DU of the IAB node 902 can have a hard DL resource type 922 and a hard UL resource type 924 during the COT 912 and not available resource type 926 afterwards (during the MCOT 914). In other words, the DU of the IAB node 902 is available for a DL transmission 918 followed by an UL transmission 928 during the COT 912 and then becomes unavailable for any other transmission during the rest of the MCOT 914. It is to be understood that the resource types depicted in and discussed with respect to FIG. 9A (and FIG. 9B) are for illustrative purposes and are non-limiting. In FIGS. 9A and 9B, the x-axis represents time in some arbitrary units.

In some aspects, the DU of the IAB node 902 may transmit a DL transmission 918 to the child node 910 (in accordance with the fact that the resource type of the DU is a hard DL resource type 922, indicating that the DU is available for a DL transmission during that period, regardless of the resource type of the MT of the IAB node 902, for example). In some aspects, the DL transmission 918 may include a DCI transmission 920 (e.g., DCI 2_0 message) including information related to the amount of COT remaining after the DL transmission 918 by the DU of the IAB node 902. The MT of the child node 910 may then determine, based on the DCI transmission 920, the remaining COT and perform a type 2 channel access procedure 930 to access the remaining COT that the DU of the IAB node 902 shared with the MT for an UL transmission 928 back to the IAB node 902. In some aspects, the DCI transmission 920 may indicate to the MT of the child node 910 that the MT of the child node 910 is to perform a type 1 channel access procedure to access the remaining COT. The MT of the child node 910, however, may still perform (e.g., autonomously despite the indication from the DCI transmission 920) a type 2 procedure (e.g., type 2A) provided that the time gap conditions for type 2 procedures are met. As such, the baseline approach for COT sharing in an IAB network allows for a DU of an IAB node 902 to share with its MT child (e.g., of IAB node 910) or UE the COT for a channel in a 5G unlicensed spectrum that was acquired for transmission by the DU, allowing the MT to access and use the same channel for UL transmission (i.e., during the remaining or shared COT). In some aspects, the MT of the child node 910 may transmit to the parent DU an indication of the switch from the type 1 channel access procedure to the type 2 channel access procedure.

The above-discussed baseline approach for COT sharing in IAB networks, however, may still lead to inefficient use of network resources, as the available MCOT 914 may not be fully utilized by either the COT-initiating or COT-receiving IAB nodes. This follows because the baseline approach stipulates that a DU of an IAB node share a COT with a child MT for that MT's communication with the DU. For example, after the UL transmission 928 by the MT of the child node 910 to the IAB node 902, the DU of the IAB node 902 may not share the remaining part of the COT (i.e., the COT after time T$_1$) with another node because the DU resource of the IAB node 902 after time T$_1$ (but before the expiry of the MCOT 914) is N/A (i.e., not available). In other words, when the DU resource type is N/A, the DU of the IAB node 902 is not available for any communication with a neighboring IAB node after time T$_1$ for the duration of MCOT, and as such the DU may not share the remaining COT with another IAB node (e.g., such as parent IAB node 906 or child node 902) to allow the other IAB node to use the COT to communicate with the IAB node 902. Further, even though the parent DU of the IAB node 906 may have a hard DL/UL/F resource type 929 (i.e., the DU is available for UL, DL or F transmissions), the DU of the IAB node 902 may not share the COT it initiated or acquired with the DU of the parent IAB node 906, according to the baseline approach to sharing COT in an IAB network.

The above-noted inefficient use of network resources can also be illustrated by FIG. 9B, where a COT initiated for use by a MT of an IAB node 932 may not be fully used because the MT may not be able to share the COT with a parent DU of a parent IAB node 934 that has N/A resource. For example, the MT may perform a type 1 channel access procedure 936 to acquire COT 938 for a channel in a 5G unlicensed spectrum and transmit an UL transmission 940 to the parent DU of the parent IAB node 934. The DU of the parent IAB node 934 may have a hard UL resource type followed by a hard DL resource type 942 during the COT, and as such may be available for an UL transmission 940 by the MT of the IAB node 932 followed by a DL transmission 944 to the MT of the IAB node 932 (e.g., the DU of the parent node 934 may perform a type 2 channel access procedure 946 to access the shared COT). After the DL transmission 944, however, the MT of the IAB node 932 may not share the remaining COT with the parent DU which has the N/A resource type after the DL transmission 944. Further, with the hard UL/DL/F resource type 952, the DU of the same IAB node 932 (i.e., the co-located DU) may be available for communication over the MT of the same IAB node 932; however, the MT may not share the remaining COT with the co-located DU for the co-located DU's transmission because the baseline approach stipulates that a MT of an IAB node may share a COT with a parent DU (e.g., and not with co-located DU). As such, despite COT acquired by a MT being available, the co-located DU may perform its own type 1 channel access procedure 950 to acquire COT for a channel in a 5G unlicensed spectrum for its own DL transmission 948, leading to inefficient use of network resources.

Figure 10A:
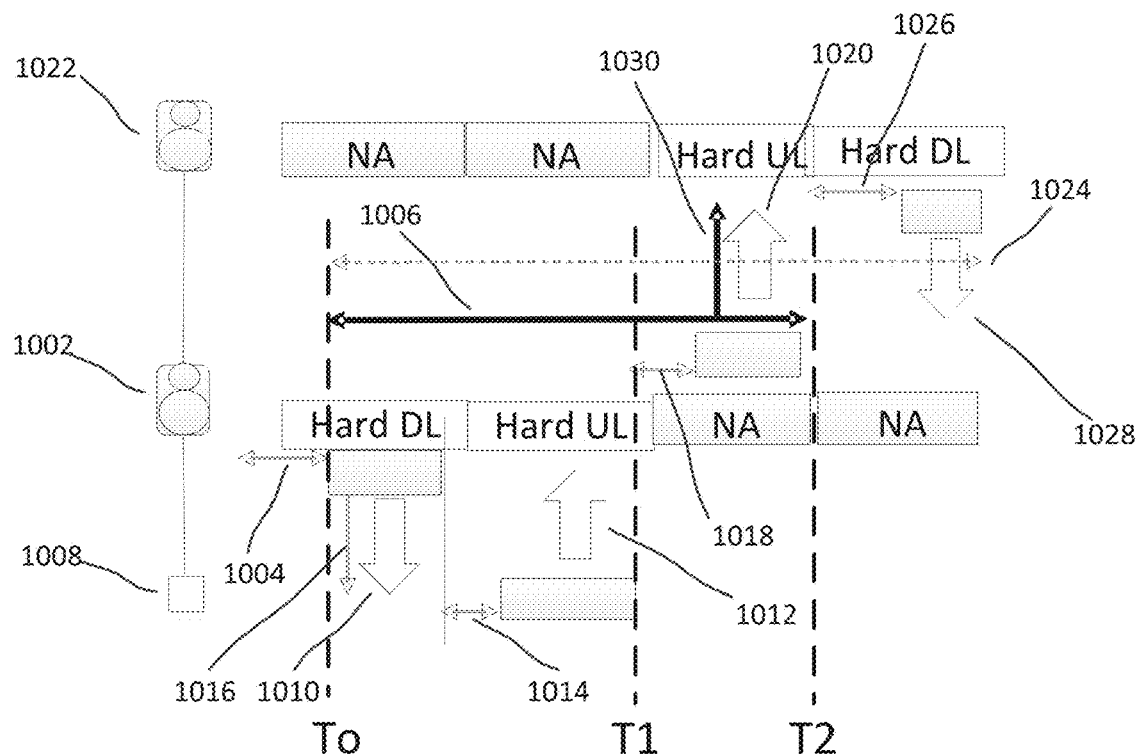
FIGS. 10A-10B illustrate COT sharing between IAB nodes in an extended approach according to aspects of the present disclosure.
Figure 10B:
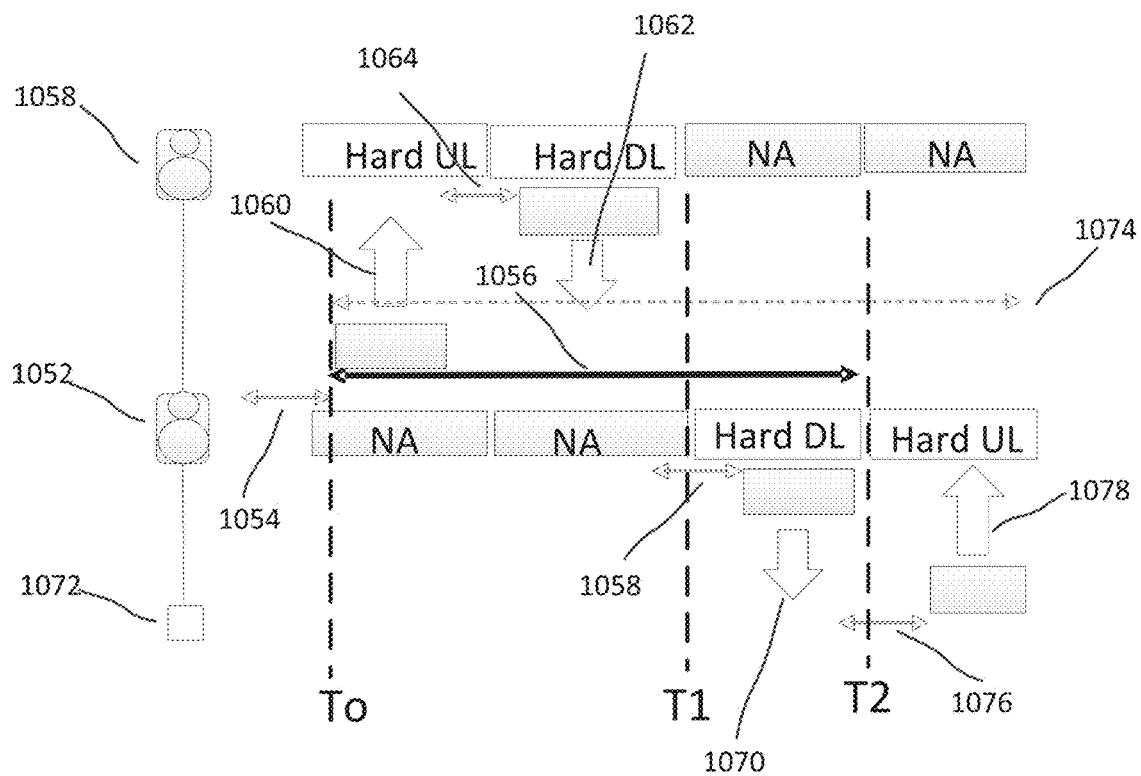

In some aspects, an extended approach for sharing a COT for a channel in a 5G unlicensed spectrum between a COT-initiating IAB node and a COT-receiving IAB node may allow for a more efficient use of IAB network resources compared to the baseline approach. Such an approach allows co-located DU and MT of an IAB to share COT each acquired for its own transmission with the other, in addition to the baseline approach of allowing the co-located DU to share the COT with its child MT and the co-located MT to share the COT with a parent DU. FIGS. 10A-10B show example illustrations of such an extended approach and the improved efficiency thereof. In FIGS. 10A and 10B, the x-axis represents time in some arbitrary units.

FIG. 10A extends aspects of FIG. 9A, with the additional feature that the COT initiated for DL transmission by the DU of the IAB node 1002 can be shared with the co-located MT of the same IAB node 1002 (referred hereafter as "case 1" of extended approach). In such cases, similar to the discussion in FIG. 9A, the DU may acquire a COT 1006 for a channel in a 5G unlicensed spectrum at time T$_o$ by performing a type 1 channel access procedure 1004, which the DU, after transmitting a DL transmission 1010, shares with the child MT of the child IAB node 1008 for the MT's UL transmission 1012. The COT 1006 may have an associated maximum COT 1024. The DL transmission 1010 from the DU may include a DCI transmission 1016 (e.g., DCI2_0 message) indicating to the MT the type of channel access procedure (e.g., type 1 channel access procedure) the MT should perform to access the shared COT. In some aspects, the child MT may perform a type 2 channel access procedure 1014 (e.g., type 2A) to access the COT despite the indication from the DCI transmission 1016, provided the conditions for the type 2 procedure are fulfilled by the shared (i.e., remaining) COT.

In contrast to the baseline approach of FIG. 9A, in the extended approach of FIG. 10A (case 1 extended approach), the COT remaining after the UL transmission by the MT of the child IAB node 1008, may be shared by the COT-initiating DU of the IAB node 1002 with the co-located MT of the same IAB node 1002, which allows the co-located MT to access the COT after time $T_1$ by performing a type 2 channel access procedure 1018 and transmit an UL transmission 1020 to the parent IAB node 1022. As such, the case 1 extended approach allows for the COT initiated by the DU of the IAB node 1002 to be shared past time $T_1$, in contrast to the baseline approach of FIG. 9A, which can result in an improved efficiency in using network resources. In some aspects, the UL transmission 1020 may include an UL signal 1030 for the parent DU of the co-located MT (i.e., the parent DU of the IAB node 1022) having information related to the type of channel access procedure performed by the co-located MT of the IAB node 1002 to access the COT. This information may allow the parent DU to determine what type of channel access procedure the parent DU may perform for its next transmission. For example, if the UL signal 1030 includes the information that the co-located MT of the IAB node 1002 switched from a type 1 to a type 2 channel access procedure prior to the UL transmission 1020, the parent DU may then perform a type 1 channel access procedure to acquire COT for a channel for its next transmission. However, if the UL signal 1030 includes the information that the co-located MT of the IAB node 1002 had not switched from a type 1 to a type 2, then the parent DU may perform a type 2 channel access procedure to acquire COT for a channel for its next transmission.

In some aspects, as noted above, the UL signal 1030 may include information related to the channel access procedure performed by the MT, i.e., the switch from type 1 channel access procedure to type 2 channel access procedure performed by the MT to acquire the COT. Further, the UL signal 1030 may include information related to the COT, such as but not limited to amount of remaining COT. In addition, the UL signal 1030 may include a request from the MT to the parent DU for the parent DU to perform a specific type of channel access procedure in transmission a DL transmission to the MT. In some aspects, the UL signal 1030 may be carried on a UCI on PUCCH, a UCI on PUSCH or a MAC CE.

In some aspects, a parent IAB node or the CU of an IAB donor (of the IAB network which the IAB node is a part of) may control the MT's switching between channel access procedure types. For example, the control unit (CU) of the IAB may configure the MT's switching between channel access procedure types by using F1 application protocol (AP) messages via F1 interface connecting the CU to the DU of the same IAB donor. In other words, the CU may communicate with the MT via the DU to allow the MT to switch channel access procedure types. In some aspects, in addition to or instead of using F1-AP messages, the CU may use RRC messages to configure MT of the IAB node to switch between channel access procedure types. In some aspects, a parent IAB node may configure a child IAB node to switch between channel access procedure types. For example, a parent DU (i.e., the DU of a parent IAB node) may configure the child IAB node via a MAC control element (MAC CE), a DCI message, a PDCCH order and/or a UL grant (e.g., Random Access Response (RAR)).

In some aspects, the IAB donor's or a parent IAB node's indication related to the switching by child MT to switch channel access procedure types may be associated with or dependent on one or more of the following parameters, including but not limited to channel access priority class (of type 1 channel access procedure) or quality of service traffic type of an UL transmission incoming from the MT. For example, an IAB node may configure a UE to perform a switch from a type 1 channel access procedure to type 2 channel access procedure within a COT for when the priority class is high with relative small MCOT and a switch from type 1 to type 2 may be disabled for low priority class with relative large MCOT. Other parameters include channel types (e.g., whether the channel for the UL transmission is PUCCH, PUSCH, PRACH, SRS, etc.), buffer status of the UL transmission by the MT, a resource type of the DU, the duration the resource type would be available, Transmission Configuration Indicator (TCI) states, such as spatial-QCL with different beam widths and/or the like.

The above-discussed extended approach (case 1 extended approach) for COT sharing in IAB networks, however, may still lead to inefficient use of network resources, as the available maximum COT MCOT 1024 may not be fully utilized by either the COT-initiating or COT-receiving IAB nodes. For example, there may be COT remaining after time $T_2$ (i.e., after the UL transmission 1020), because the extended approach of FIG. 10A case 1 extended approach allows the DU of the IAB node 1002 to share COT either with a child MT (as in the case of the baseline approach) or a co-located MT (and in particular not with a parent DU of a parent IAB node 1022). As such, the DU of the IAB node 1002 may not share the remaining COT with the parent DU of the IAB node 1022, resulting in the parent DU performing a type 1 channel access procedure 1026 for a DL transmission 1028 to the IAB node 1002. As such the COT used by the COT-initiated node 1002 and COT-receiving nodes 1008 and 1022 (e.g., extending from $T_0$ to $T_2$) may still be shorter in duration compared to MCOT, resulting in an inefficient use of IAB network resources (although, as discussed above, with an improved efficiency over the baseline approach of FIG. 9A).

FIG. 10B extends aspects of FIG. 9B, with the additional feature that the COT initiated for UL transmission by the MT of the IAB node 1052 can be shared with the co-located DU of the same IAB node 1052. In such cases, similar to the discussion in FIG. 9B, the MT may acquire a COT 1056 for a channel in a 5G unlicensed spectrum at time $T_o$ by performing a type 1 channel access procedure 1064, which the MT, after transmitting an UL transmission 1060, shares with the parent DU of the parent IAB node 1058 for the parent DU's DL transmission 1062. The COT 1056 may have an associated maximum COT 1074. As the parent DU of the IAB node 1058 controls the communications of the child MT of the IAB node 1052, the parent DU may already have information about the available or remaining COT after UL transmission 1060, and as such can perform a type 2 channel access procedure 1064 (e.g., type 2A) to access the COT and transmit the DL transmission 1062.

In contrast to the baseline approach of FIG. 9B, in the extended approach of FIG. 10B (referred herein as "case 2" extended approach), the COT remaining after the DL transmission 1062 by the parent DU of the parent IAB node 1058, may be shared by the COT-initiating MT of the IAB node 1052 with the co-located DU of the same IAB node 1052, which allows the co-located DU to access the COT after time $T_1$ by performing a type 2 channel access procedure 1058 and transmit a DL transmission 1070 to the MT of the child IAB node or UE 1072. As such, case 2 extended approach allows for the COT 1056 initiated by the MT of the IAB node 1052 to be shared past time $T_1$, in contrast to the baseline approach of FIG. 9B, which can result in an improved efficiency in using network resources. In some aspects, the DL transmission 1070 may not include information related to the remaining COT to avoid further COT sharing with the MT of the child IAB node or UE 1072, as case 2 extended approach does not allow a MT of an IAB node (e.g., MT of the IAB node 1052) to share COT with an MT of a child IAB node (e.g., MT of the child IAB node or UE 1072) or a UE.

The extended approach of FIG. 10B (case 2 extended approach) for COT sharing in IAB networks, however, may still lead to inefficient use of network resources, as the available maximum COT MCOT 1074 may not be fully utilized by either the COT-initiating or COT-receiving IAB nodes. For example, there may be COT remaining after time $T_2$ (i.e., after the DL transmission 1070), because case 2 extended approach allows the MT of the IAB node 1052 to share COT either with a parent DU (as in the case of the baseline approach) or a co-located DU (and in particular not with a child MT of a child IAB node 1072). As such, the MT of the IAB node 1052 may not share the remaining COT with the child MT of the IAB node 1072, resulting in the child MT performing a type 1 channel access procedure 1076 for an UL transmission 1078 to the IAB node 1052. As such the COT used by the COT-initiated node 1052 and COT-receiving nodes 1058 and 1072 (e.g., extending from $T_o$ to $T_2$) may still be shorter in duration compared to MCOT, resulting in an inefficient use of IAB network resources (although, as discussed above, with an improved efficiency over the baseline approach of FIG. 9B).

As discussed above, the case 1 extended approach may still lead to inefficient use of IAB network resources. For example, with respect to FIG. 10A, even though there was DU-initiated COT 1024 remaining after time $T_2$, the DU (of the IAB node 1002) may not share the COT with the parent DU of the parent IAB node 1022 since case 1 extended approach does not allow a DU sharing COT with a parent DU. In some aspects, a case 3 extended approach for COT sharing in IAB networks extends aspects of the case 1 extended approach, with the additional feature that the COT initiated for DL transmission by the DU of the IAB node 1102 can be shared with the parent DU of the parent IAB node 1122 for use by the parent DU of the COT-receiving node 1122 to communicate with the COT-initiating node 1102 (e.g., and not with any other IAB node of the IAB network).

Figure 11A:
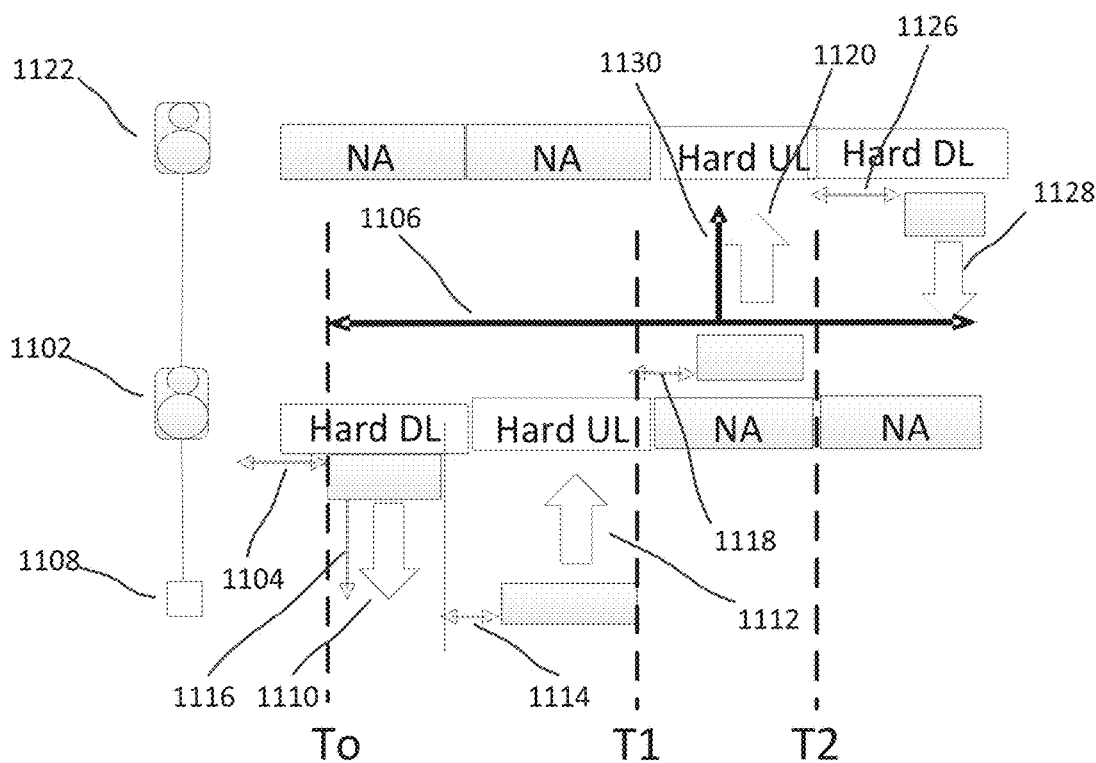
FIGS. 11A-11B illustrate COT sharing between IAB nodes in an extended approach according to aspects of the present disclosure.

With reference to FIG. 11A, the DU of the IAB node 1102 may acquire a COT for a channel in a 5G unlicensed spectrum at time $T_o$ by performing a type 1 channel access procedure 1104, which the DU, after transmitting a DL transmission 1110, shares with the child MT of the child IAB node 1108 for the MT's UL transmission 1112. The COT 1106 may have an associated maximum COT. The DL transmission 1110 from the DU may include a DCI transmission 1116 (e.g., DCI2_0 message) indicating to the MT of the IAB node 1108 the type of channel access procedure (e.g., type 1 channel access procedure) the MT should perform to access the shared COT. In some aspects, the child MT may perform a type 2 channel access procedure 1114 (e.g., type 2A) to access the COT despite the indication from the DCI transmission 1116, provided the conditions for the type 2 procedure are fulfilled by the shared (i.e., remaining) COT. In FIG. 11A, the x-axis represents time in some arbitrary units.

The COT-initiating DU of the IAB node 1102 may then share with the co-located MT of the same IAB node 1102 the remaining COT (e.g., remaining after the UL transmission by the MT of the child IAB node 1108), which allows the co-located MT to access the COT after time $T_1$ by performing a type 2 channel access procedure 1118 and transmit an UL transmission 1120 to the parent IAB node 1122. In some aspects, the UL transmission 1120 may include an UL signal 1130 for the parent DU of the co-located MT (i.e., the parent DU of the IAB node 1122) having COT sharing information (e.g., COT available for sharing with the parent DU of the IAB node 1122 after UL transmission 1120, i.e., after time $T_2$), which may allow the parent DU to determine whether it can perform type 2 channel access procedure to access the COT. In some cases, the parent DU may not have this information otherwise (i.e., without receiving it via the UL signal 1130 because the parent DU may not control the DU of the IAB node 1102).

In some aspects, case 3 extended approach allows the COT-initiating DU of the IAB node 1102 to share any COT remaining after UL transmission 1120, i.e., after time T2, with the parent DU of the parent IAB node 1122. For example, as noted above, the UL transmission 1120 may include an UL signal 1130 including information related to the available COT, and in return, the parent DU of the IAB node 1122 may perform a type 2 channel access procedure 1126 to access the available COT for DL transmission 1128 to the IAB node 1102. As such, the case 3 extended approach allows for the COT initiated by the DU of the IAB node 1102 to be shared past time $T_2$, in some cases for the duration of the maximum COT MCOT, in contrast to both the baseline approach of FIG. 9A and case 1 extended approach of FIG. 10A, which can result in an improved efficiency in using network resources.

In some aspects, as noted above, the UL signal 1130 may include information related to the channel access procedure performed by the MT, i.e., the switch from type 1 channel access procedure to type 2 channel access procedure performed by the MT to acquire the COT. Further, the UL signal 1130 may include information related to the COT, such as but not limited to amount of remaining COT. In addition, the UL signal 1130 may include a request from the MT to the parent DU for the parent DU to perform a specific type of channel access procedure in transmission a DL transmission to the MT. In some aspects, the UL signal 1130 may be carried on a UCI on PUCCH, a UCI on PUSCH or a MAC CE.

As discussed above, the case 2 extended approach may still lead to inefficient use of IAB network resources. For example, with respect to FIG. 10B, even though there was MT-initiated COT 1074 remaining after time $T_2$, the MT (of the IAB node 1052) may not share the COT with the child MT of the child IAB node or UE 1072 because case 2 extended approach for sharing COT does not allow a MT sharing COT with a child MT or UE. In some aspects, a case 4 extended approach for COT sharing in IAB networks extends aspects of the case 4 extended approach, with the additional feature that the COT initiated for UL transmission by the MT of the IAB node 1152 can be shared with the child MT of the parent IAB node or UE 1172 for use by the child MT of the parent IAB node or UE 1172 to communicate with the COT-initiating node 1152 (e.g., and not with any other IAB node of the IAB network).

Figure 11B:
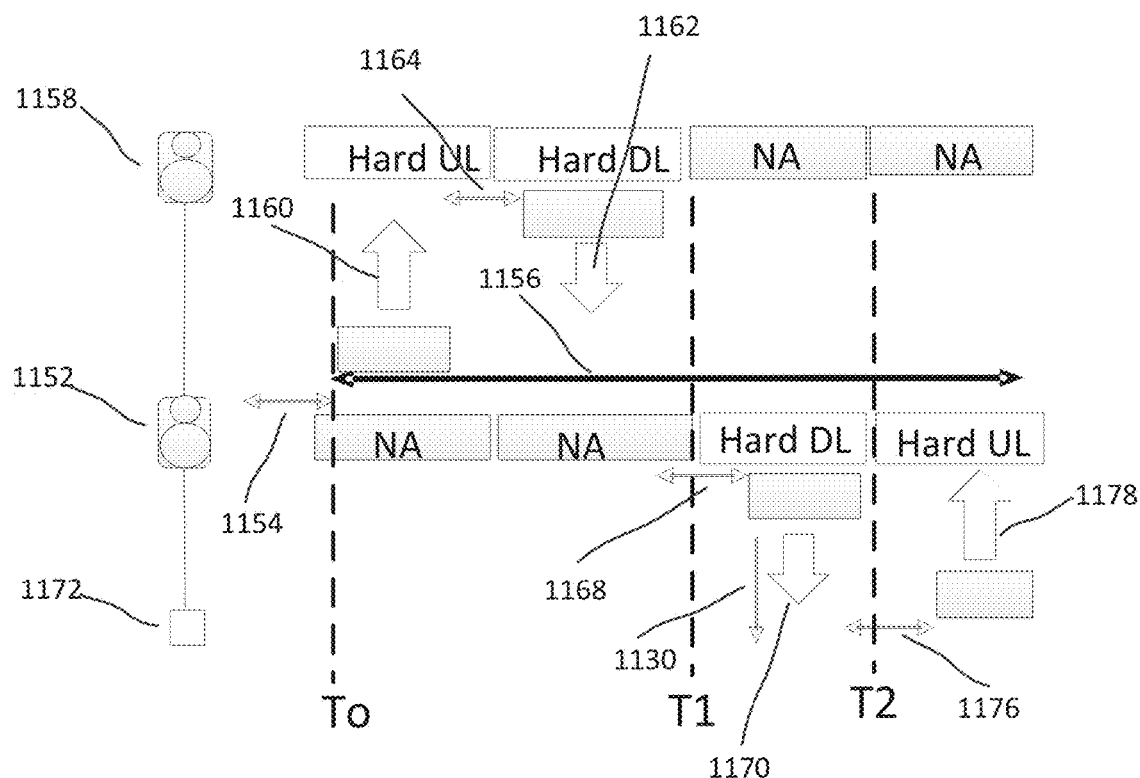

With reference to FIG. 11B, the MT of the IAB node 1152 may acquire a COT for a channel in a 5G unlicensed spectrum at time $T_o$ by performing a type 1 channel access procedure 1154, which the MT, after transmitting a UL transmission 1160, shares with the parent DU of the parent IAB node 1158 for the DU's DL transmission 1162. The COT 1156 may have an associated maximum COT MCOT. As the parent DU controls the communications of the child MT (of the IAB node 1152), the parent DU may have the information related to the available COT remaining after the UL transmission 1160 (e.g., even without a DCI transmission from the child MT of the IAB node 1152). In some aspects, the parent DU may perform a type 2 channel access procedure 1164 (e.g., type 2A) to access the COT, provided the conditions for the type 2 procedure are fulfilled by the shared (i.e., remaining) COT. In FIG. 11B, the x-axis represents time in some arbitrary units.

The COT-initiating MT of the IAB node 1152 may then share with the co-located DU of the same IAB node 1152 the remaining COT (e.g., remaining after the DL transmission by the DU of the child IAB node 1158), which allows the co-located DU to access the COT after time $T_1$ by performing a type 2 channel access procedure 1168 and transmit a DL transmission 1170 to the child IAB node 1172. In some aspects, the UL transmission 1120 may include a DCI transmission 1130 (e.g., DCI2_0 message) for the child MT of IAB node or UE 1172 having COT sharing information (e.g., COT available for sharing with the child MT of the IAB node or UE 1172 after DL transmission 1170, i.e., after time $T_2$), which may allow the child MT to determine whether it can perform type 2 channel access procedure to access the COT.

In some aspects, case 4 extended approach allows the COT-initiating MT of the IAB node 1152 to share any COT remaining after DL transmission 1170, i.e., after time $T_2$, with the child MT of the child IAB node or UE 1172. For example, as noted above, the DL transmission 1170 may include a DCI transmission 1130 including information related to the available COT, and in return, the child MT of the IAB node or UE 1172 may perform a type 2 channel access procedure 1126 to access the available COT for UL transmission 1178 to the IAB node 1152. As such, the case 4 extended approach allows for the COT initiated by the MT of the IAB node 1152 to be shared past time $T_2$, in some cases for the duration of the maximum COT MCOT, in contrast to both the baseline approach of FIG. 9B and case 2 extended approach of FIG. 10B, which can result in an improved efficiency in using network resources.

Figure 12A:
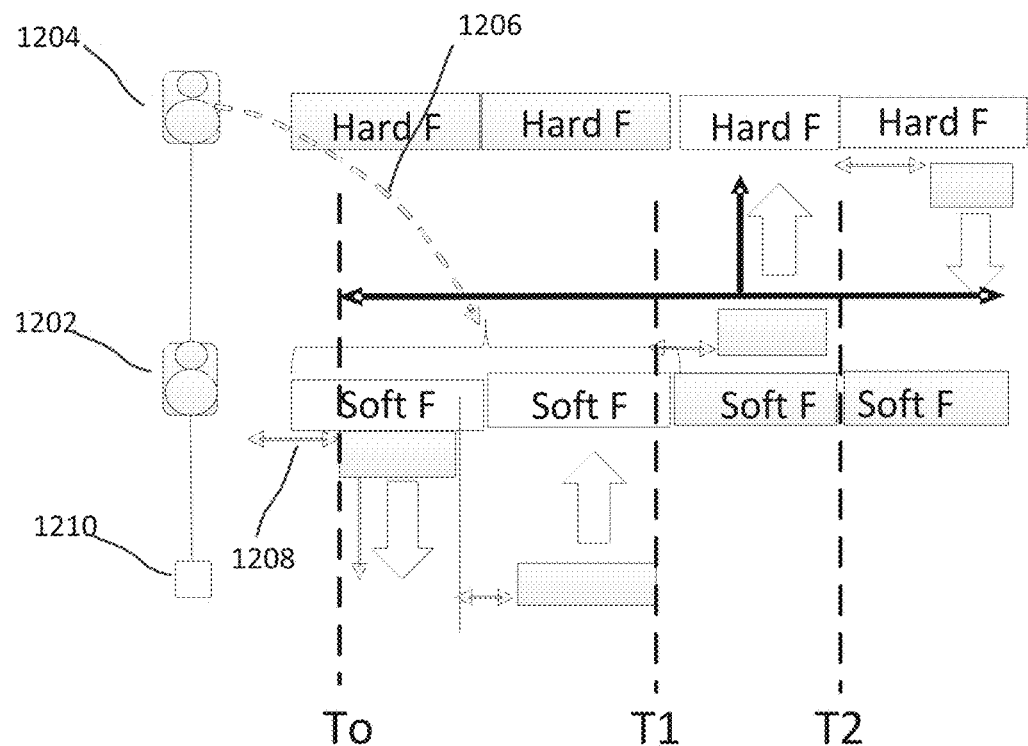
FIGS. 12A-12B illustrate COT sharing between IAB nodes in an extended approach according to aspects of the present disclosure.
Figure 12B:
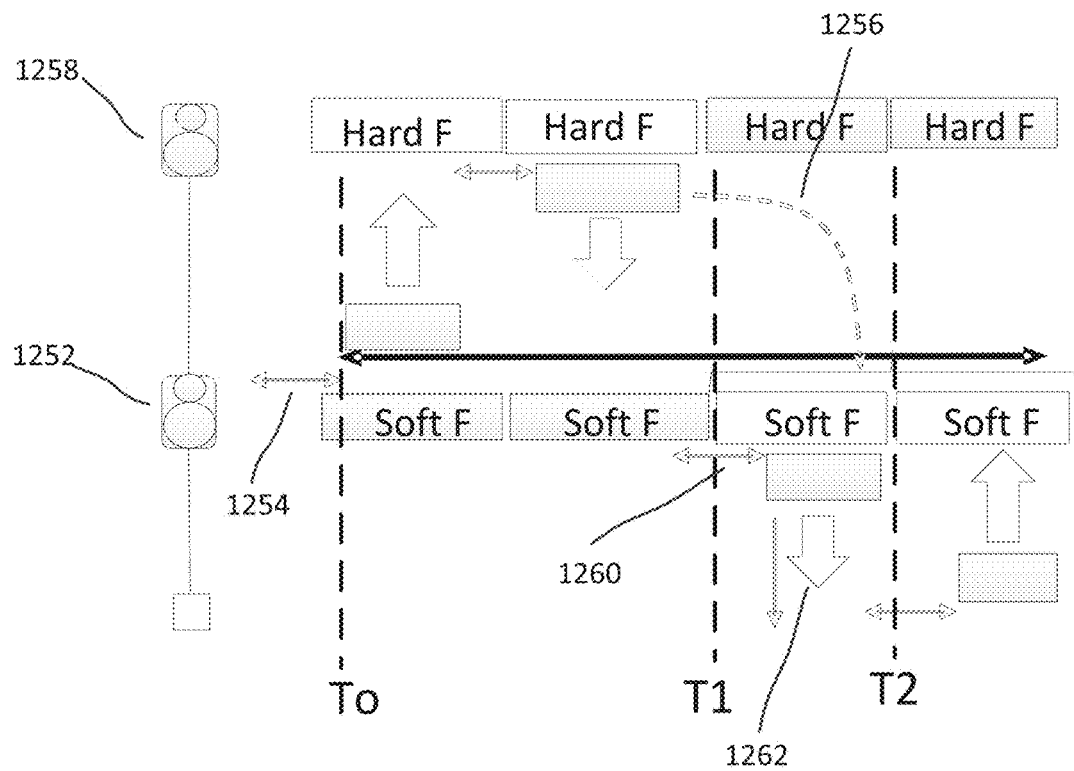

FIGS. 9A-9B, FIGS. 10A-10B and FIGS. 11A-11B show the DU of the IAB nodes (such as but not limited to IAB nodes 902, 906, 910, 934, 1002, 1008, 1022, 1052, 1058, 1072, 1102, 1108, 1122, 1152, 1158, 1172) as having hard resource type (for UL or DL transmissions) or N/A resource type during different periods of the COT. As discussed above, hard UL or DL resource type means the DU may be available for UL or DL transmission, respectively, during the period when the resource type is hard, and N/A resource type means that the DU resource is unavailable for communication during the period when the resource type is N/A. The resource types of the DUs of the IABs as presented in FIGS. 9A-9B, FIGS. 10A-10B and FIGS. 11A-11B are for illustrative purposes and non-limiting, and the DUs can have other resource types (or combinations thereof). FIGS. 12A-12B show example illustrations of COT sharing in an IAB network that are substantially similar to FIGS. 11A-11B, respectively, but with the DUs of the IAB nodes having different resource types. For example, in contrast to the hard resource type of the DU of the IAB node 1102 in FIG. 11A, FIG. 12A includes a DU of an IAB node 1202 with resource type that is soft flexible (soft F). In other words, the DU resource is only available for UL and DL communications of the IAB node when a parent node of the IAB node indicates that the soft flexible resource is available. In FIG. 12A, the parent node 1204 transmits such an indication 1206 (e.g., explicit or implicit), which indicates to the DU resource type to function as a hard resource type, i.e., be available for UL and DL communications, allowing the DU to perform a channel access procedure 1208 to acquire a COT and share the COT with neighboring IAB nodes 1204 and 1210 as discussed with reference to FIG. 11A.

Similarly, FIG. 12B, which is substantially similar to FIG. 11B, includes a DU of an IAB node 1252 with resource type that is soft flexible (soft F), in contrast to the hard resource type of the DU of the IAB node 1152 in FIG. 11B. In other words, the DU resource of the IAB node 1252 is only available for UL and DL communications of the IAB node when a parent node of the IAB node indicates that the soft flexible resource is available. In FIG. 12B, the MT of the IAB node 1252 performs a type 1 channel access procedure 1254 to acquire a COT at time $T_o$, which the MT shares with its co-located DU at time $T_1$. The parent node 1258 of the DU (of the IAB node 1252) may transmit an indication 1256 (e.g., explicit or implicit) indicating to the DU resource type to function as a hard resource type, i.e., be available for UL and DL communications, allowing the DU to perform a channel access procedure 1260 to access the COT shared by the MT for DL transmission 1262 as discussed above with reference to FIG. 11B.

Figure 13:
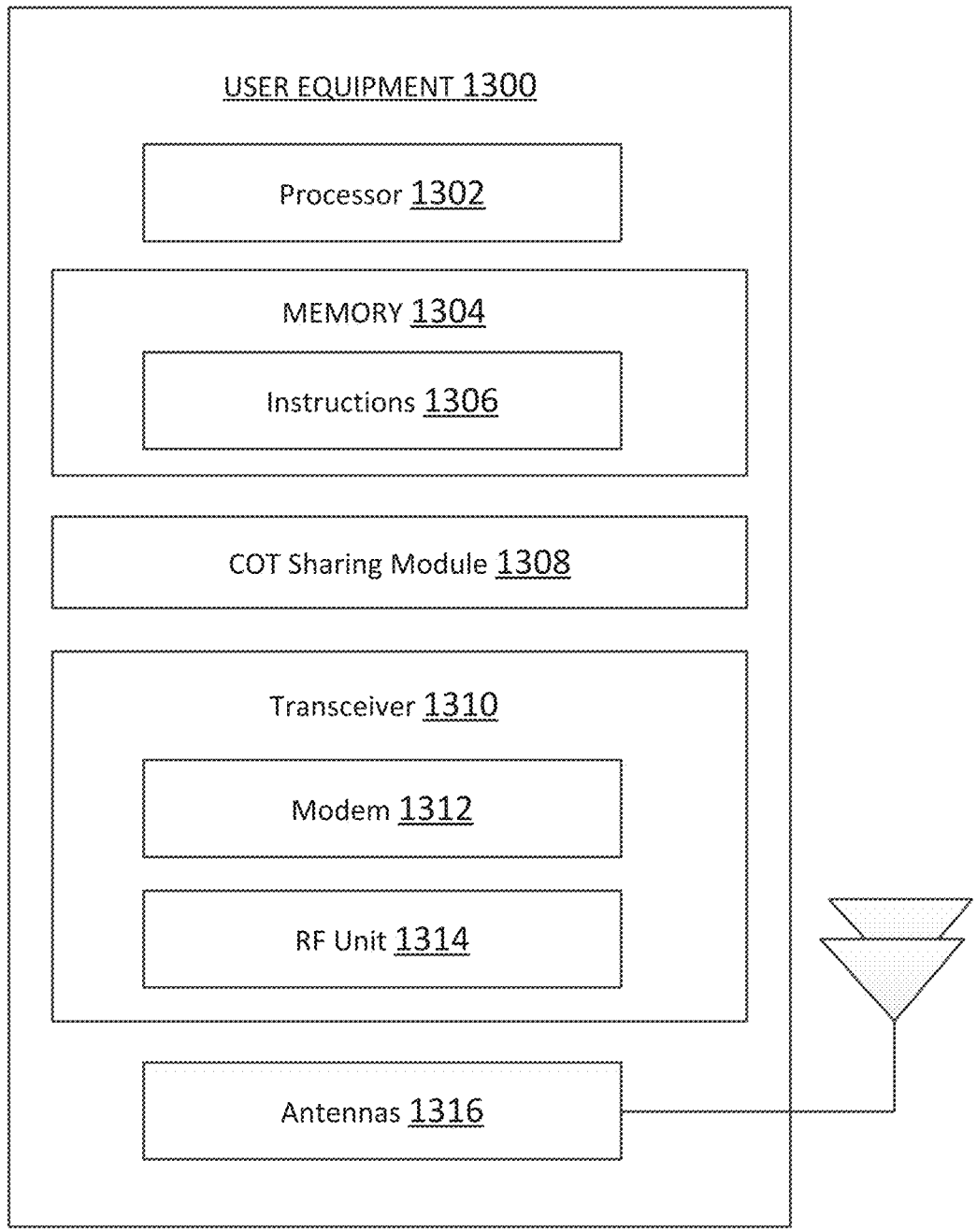
FIG. 13 is a block diagram of an example UE according to aspects of the present disclosure.

FIG. 13 is a block diagram of an exemplary UE 1300 according to aspects of the present disclosure. The UE 1300 may be a UE 115 in the network 100, the network 200, the network 300 or the network 400 as discussed above in FIG. 1, 2, 3 or 4A, respectively. The UE 1300 can also be UE 475 in the IAB network 450, as discussed above in FIG. 4B. As shown, the UE 1300 may include a processor 1302, a memory 1304, a COT sharing module 1308, a channel access module 1309, a transceiver 1310 including a modem subsystem 1312 and a radio frequency (RF) unit 1314, and one or more antennas 1316. These elements may be in direct or indirect communication with each other, for example via one or more buses.

The processor 1302 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 1302 may also be implemented as a combination of computing devices, e.g., a combination of a DSP and a microprocessor, a plurality of microprocessors, one or more microprocessors in conjunction with a DSP core, or any other such configuration.

The memory 1304 may include a cache memory (e.g., a cache memory of the processor 1302), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 1304 includes a non-transitory computer-readable medium. The memory 1304 may store, or have recorded thereon, instructions 1306. The instructions 1306 may include instructions that, when executed by the processor 1302, cause the processor 1302 to perform the operations described herein with reference to the UEs 115 in connection with aspects of the present disclosure, for example, aspects of FIGS. 1-12 and 15-17. Instructions 1306 may also be referred to as program code. The program code may be for causing a wireless communication device to perform these operations, for example by causing one or more processors (such as processor 1302) to control or command the wireless communication device to do so. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The COT sharing module 1308 may be implemented via hardware, software, or combinations thereof. For example, the COT sharing module 1308 may be implemented as a processor, circuit, and/or instructions 1306 stored in the memory 1304 and executed by the processor 1302. The COT sharing module 1308 may be used for various aspects of the present disclosure, including aspects of FIGS. 1-12 and 15-17. For example, the COT sharing module 1308 is configured to perform channel access procedures (e.g., as discussed with reference to FIGS. 7A-7E) to allow the UE 1300 to access COT shared by its parent IAB node, as discussed in the aspects of FIGS. 1-12 and 15-17.

As shown, the transceiver 1310 may include the modem subsystem 1312 and the RF unit 1314. The transceiver 1310 can be configured to communicate bi-directionally with other devices, such as the BSs 105. The modem subsystem 1312 may be configured to modulate and/or encode the data from the memory 1304, the channel access module 1309, and/or the COT sharing module 1308, according to a modulation and coding scheme (MCS), e.g., a low-density parity check (LDPC) coding scheme, a turbo coding scheme, a convolutional coding scheme, a digital beamforming scheme, etc. The RF unit 1314 may be configured to process (e.g., perform analog to digital conversion or digital to analog conversion, etc.) modulated/encoded data from the modem subsystem 1312 (on outbound transmissions) or of transmissions originating from another source such as a UE 115 or a BS 105. The RF unit 1314 may be further configured to perform analog beamforming in conjunction with the digital beamforming. Although shown as integrated together in transceiver 1310, the modem subsystem 1312 and the RF unit 1314 may be separate devices that are coupled together at the UE 115 to enable the UE 115 to communicate with other devices.

The RF unit 1314 may provide the modulated and/or processed data, e.g. data packets (or, more generally, data messages that may contain one or more data packets and other information), to the antennas 1316 for transmission to one or more other devices. The antennas 1316 may further receive data messages transmitted from other devices. The antennas 1316 may provide the received data messages for processing and/or demodulation at the transceiver 1310. The antennas 1316 may include multiple antennas of similar or different designs in order to sustain multiple transmission links. The RF unit 1314 may configure the antennas 1316.

In an aspect, the UE 1300 can include multiple transceivers 1310 implementing different RATs (e.g., NR and LTE). In an aspect, the UE 1300 can include a single transceiver 1310 implementing multiple RATs (e.g., NR and LTE). In an aspect, the transceiver 1310 can include various components, where different combinations of components can implement RATs.

Figure 14:
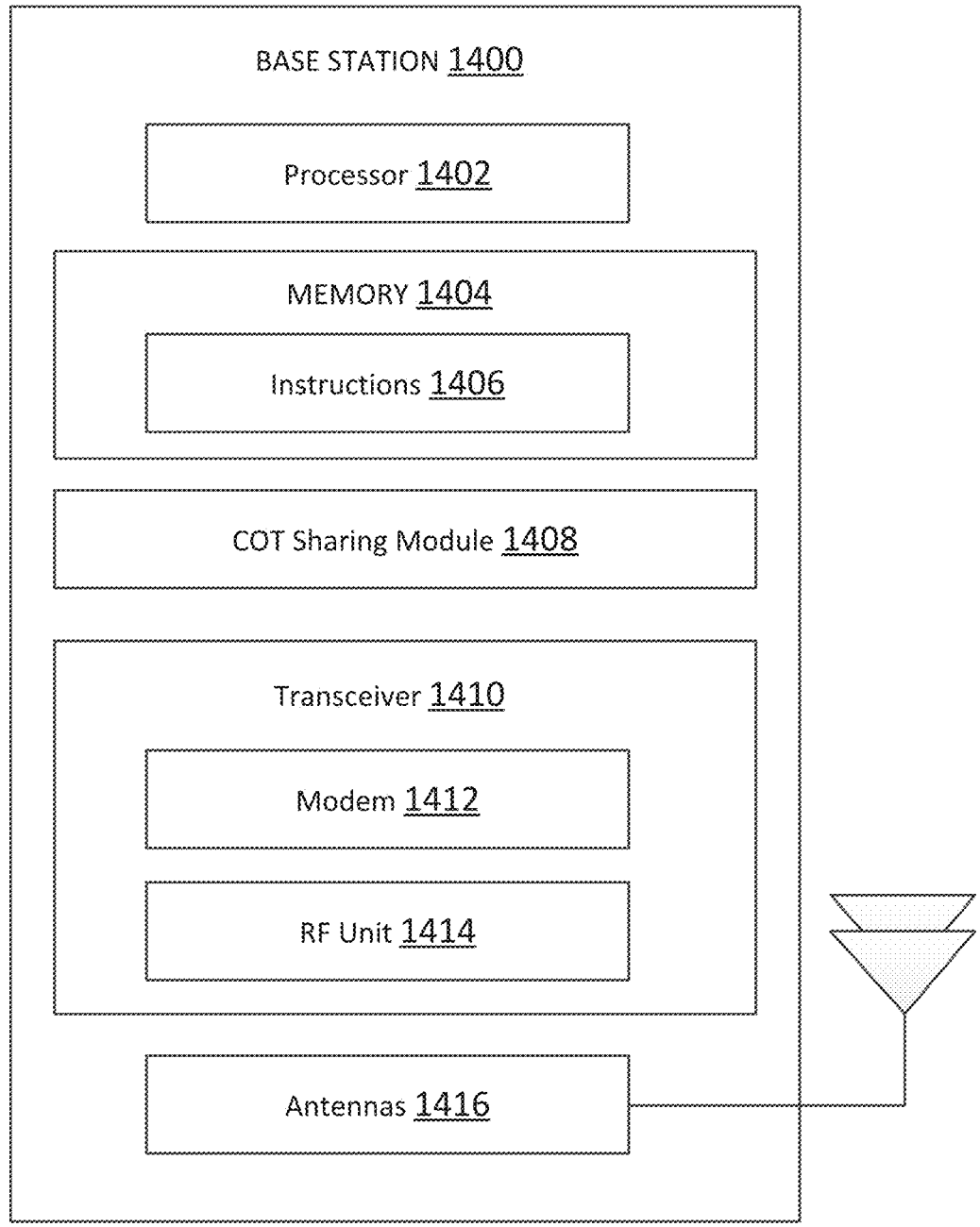
FIG. 14 is a block diagram of an example base station (BS) according to aspects of the present disclosure.

FIG. 14 is a block diagram of an exemplary BS 1400 according to aspects of the present disclosure. The BS 1400 may be a BS 105 in the networks 100, 200, 300 or 400 as discussed above in FIG. 1, 2 3, or 4A, respectively. The BS 1400 can be the IAB donor 410 or the IAB node 105 of the IAB network 400 of FIG. 4A. The BS 1400 can also be the IAB donor 455 or the IAB nodes 465 or 466 of the IAB network 450 of FIG. 4B. As shown, the BS 1400 may include a processor 1402, a memory 1404, a COT sharing module 1408, a transceiver 1410 including a modem subsystem 1412 and a RF unit 1414, and one or more antennas 1416. These elements may be in direct or indirect communication with each other, for example via one or more buses.

The processor 1402 may have various features as a specific-type processor. For example, these may include a CPU, a DSP, an ASIC, a controller, a FPGA device, another hardware device, a firmware device, or any combination thereof configured to perform the operations described herein. The processor 1402 may also be implemented as a combination of computing devices, e.g., a combination of a DSP and a microprocessor, a plurality of microprocessors, one or more microprocessors in conjunction with a DSP core, or any other such configuration.

In some aspects, the processor 1402 may be configured to perform, for signal transmission by a first entity of an IAB node (e.g., the DU of the IAB node), a first channel access procedure to reserve or acquire a COT for a channel in an unlicensed 5G spectrum. The processor 1402 may also be configured to allow a second entity (e.g., the MT of the IAB node) to access the channel and communicate a communication signal via the channel, during the COT. The processor 1402 is also configured to perform a second channel access procedure for the second entity to access the channel and communicate the communication signal, during the COT. In such aspects of the present disclosure, the first entity and the second entity may be co-located in the IAB node and one of the first entity or the second entity is a DU of the IAB and the other entity is a MT of the IAB.

The memory 1404 may include a cache memory (e.g., a cache memory of the processor 1402), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 1404 may include a non-transitory computer-readable medium. The memory 1404 may store instructions 1406. The instructions 1406 may include instructions that, when executed by the processor 1402, cause the processor 1402 to perform operations described herein, for example, aspects of FIGS. 1-12 and 15-17. Instructions 1406 may also be referred to as code, which may be interpreted broadly to include any type of computer-readable statement(s) as discussed above with respect to FIG. 13.

The COT sharing module 1408 may be implemented via hardware, software, or combinations thereof. For example, the COT sharing module 1408 may be implemented as a processor, circuit, and/or instructions 1406 stored in the memory 1404 and executed by the processor 1402. The COT sharing module 1408 may be used for various aspects of the present disclosure, aspects of FIGS. 1-12 and 15-17. For example, the COT sharing module 1408 is configured to perform, for signal transmission by a first entity of an IAB node (e.g., the DU of the IAB node), a first channel access procedure to reserve or acquire a COT for a channel in an unlicensed 5G spectrum. The COT sharing module 1408 may also be configured to allow a second entity (e.g., the MT of the IAB node) to access the channel and communicate a communication signal via the channel, during the COT. The COT sharing module 1408 is also configured to perform a second channel access procedure for the second entity to access the channel and communicate the communication signal, during the COT. In such aspects of the present disclosure, the first entity and the second entity may be co-located in the IAB node and one of the first entity or the second entity is a DU of the IAB and the other entity is a MT of the IAB.

In an aspect, the COT sharing module 1408 is further configured to perform, for signal transmission by a first entity that is co-located with a second entity, a first channel access procedure to reserve a channel occupancy time (COT) for a channel in an unlicensed 5G spectrum. The COT sharing module 1408 is further configured to communicate, via the second entity, a first communication signal with a third entity to allow the third entity to access the channel and communicate with the IAB, during the COT. In addition, the COT sharing module 1408 may be configured to receive, at the IAB, a second communication signal from the third entity during the COT. In some of such aspects, the first entity is a first DU, the second entity is a MT and the third entity is a parent DU of the IAB node. In yet some of such aspects, the first entity is a first MT, the second entity is a DU and the third entity is a UE or a child MT of the IAB node.

In an aspect, the COT sharing module 1408 is further configured to perform, for signal transmission by a first entity, a first channel access procedure to reserve a channel occupancy time (COT) for a channel in an unlicensed 5G spectrum. The COT sharing module 1408 is further configured communicate a first communication signal with a second entity to allow the second entity to access the channel and communicate with the first entity, during the COT. In addition, the COT sharing module 1408 is further configured to receive a second communication signal from the second entity during the COT. In some of such aspects, the first entity can be a DU of the first IAB node, and the second entity is either (i) a UE or (ii) a MT of a second IAB node that is a child node of the first IAB node. In yet some of such respects, the first entity is an MT of the first IAB node, and the second entity is a DU of the second IAB node that is a parent node of the first IAB node. Mechanisms for sharing a first IAB node's COT acquired for a scheduled communication (TX/RX) with a second IAB node or a UE are described in greater detail herein.

As shown, the transceiver 1410 may include the modem subsystem 1412 and the RF unit 1414. The transceiver 1410 can be configured to communicate bi-directionally with other devices, such as the UEs 115 and/or another core network element. The modem subsystem 1412 may be configured to modulate and/or encode data according to a MCS, e.g., a LDPC coding scheme, a turbo coding scheme, a convolutional coding scheme, a digital beamforming scheme, etc. The RF unit 1414 may be configured to process (e.g., perform analog to digital conversion or digital to analog conversion, etc.) modulated/encoded data from the modem subsystem 1412 (on outbound transmissions) or of transmissions originating from another source such as a UE 115. The RF unit 1414 may be further configured to perform analog beamforming in conjunction with the digital beamforming. Although shown as integrated together in transceiver 1410, the modem subsystem 1412 and/or the RF unit 1414 may be separate devices that are coupled together at the BS 105 to enable the BS 105 to communicate with other devices.

The RF unit 1414 may provide the modulated and/or processed data, e.g. data packets (or, more generally, data messages that may contain one or more data packets and other information), to the antennas 1416 for transmission to one or more other devices. This may include, for example, transmission of information to complete attachment to a network and communication with a camped UE 115 according to aspects of the present disclosure. The antennas 1416 may further receive data messages transmitted from other devices and provide the received data messages for processing and/or demodulation at the transceiver 1410. The antennas 1416 may include multiple antennas of similar or different designs in order to sustain multiple transmission links.

In an aspect, the BS 1400 can include multiple transceivers 1410 implementing different RATs (e.g., NR and LTE). In an aspect, the BS 1400 can include a single transceiver 1410 implementing multiple RATs (e.g., NR and LTE). In an aspect, the transceiver 1410 can include various components, where different combinations of components can implement RATs.

In some aspects, the transceiver 1410 may be configured to communicate, via a second entity co-located with a first entity, a first communication signal with a third entity to allow the third entity to access a channel to communicate with an IAB during a COT acquired by the first entity, the IAB including the first entity and the second entity. In addition, the transceiver 1410 may be configured to receive, at the IAB, a second communication signal from the third entity during the COT. In some of such aspects, the first entity is a first DU, the second entity is a MT and the third entity is a parent DU of the IAB node. In yet some of such aspects, the first entity is a first MT, the second entity is a DU and the third entity is a UE or a child MT of the IAB node.

In some aspects, the transceiver 1410 may be configured to communicate a first communication signal with a second entity to allow the second entity to access a channel to communicate with the first entity during a COT acquired by the first entity. In addition, the transceiver 1410 is further configured to receive a second communication signal from the second entity during the COT. In some of such aspects, the first entity can be a DU of the first IAB node, and the second entity is either (i) a UE or (ii) a MT of a second IAB node that is a child node of the first IAB node. In yet some of such respects, the first entity is an MT of the first IAB node, and the second entity is a DU of the second IAB node that is a parent node of the first IAB node.

As discussed above, the baseline approach to sharing a COT between a first and a second IAB nodes of an IAB network (such as IAB network 400 or 450 of FIGS. 4A-4B) allow for a COT initiated for communication by the DU or MT of the first node to be shared with the child MT or UE, or parent DT, respectively, of the second IAB node. Case 1 extended approach extends the baseline approach by further allowing the sharing, of a COT initiated for communication by a DU of an IAB node, with a co-located MT of the same IAB node, while case 2 extended approach extends the baseline approach by further allowing the sharing, of a COT initiated for communication by a MT of an IAB node, with a co-located DU of the same IAB node. Case 3 extended approach further extends the case 1 extended approach by further allowing the sharing, of a COT initiated for communication by a DU of an IAB node, with a parent DU of the IAB node (i.e., a DU of a parent IAB node), while case 4 extended approach further extends the case 2 extended approach by further allowing the sharing, of a COT initiated for communication by a MT of an IAB node, with a child MT of the IAB node (i.e., a MT of a child IAB node) or a UE. As noted above, these IAB nodes are the IAB nodes (e.g., BSs) of IAB networks 400 or 450 and the UE can be the UEs of IAB networks 400 or 450.

In some aspects, whether an IAB network supports these approaches for sharing COT between IAB nodes may be controlled by the IAB donor of the IAB networks. For example, the control unit (CU) of the IAB donor (e.g., the CU of the IAB donor 105c of the IAB network 300, the CU of the IAB donor 410 of IAB network 400 or the CU 415 of the IAB donor 455 of IAB network 450) may configure the COT-sharing IAB nodes to adopt any of the COT-sharing approaches using F1 application protocol (AP) messages via F1 interface connecting the CU to the DU of the same IAB donor (e.g., F1 interface connecting CU 415 to DU 425). In other words, the CU may communicate with the IAB nodes via the DU to allow the IAB nodes to adopt one of the COT sharing approaches discussed herein. In some aspects, in addition to or instead of using F1-AP messages, the CU may use RRC messages to configure the COT-sharing IAB nodes for COT sharing. In some aspects, a parent IAB node may configure a child IAB node to adopt any one of the COT-sharing approaches. For example, a parent DU (i.e., the DU of a parent IAB node) may configure the child IAB node via a MAC control element (MAC CE) or a DCI. In some aspects, the configurations may be pre-defined.

In some aspects, a DU or MT of an IAB node or a UE may perform a type 2 channel access procedure to access a shared COT, examples of which includes the type 2 channel access procedures in FIGS. 8-12. As discussed above, type 2 channel access procedure can be one of a type 2A channel access procedure, a type 2B channel access procedure or a type 2C channel access procedure based on the duration of the gap between an end of a previous communication (TX/RX) by the COT-initiating node before the sharing of the COT and the start of the next transmission (TX) by the COT-receiving node or device. In some aspects, the type 2 channel access procedure can be a type 2A channel access procedure if the gap between the previous TX/RX and the subsequent TX is exactly 25 µs. In some aspects, the type 2 channel access procedure can be a type 2A channel access procedure if the gap between the previous TX/RX and the subsequent TX is greater than or equal to 25 µs. In some aspects, in an IAB network, a number of guard symbols can be provided by parent node to avoid overlapped resources at child node during MT to DU or DU to MT transition, which may leave a gap greater than 25 µs between MT and DU. In some aspects, if the gap is less than or equal to 25 µs, the gap duration may be counted in the COT. In some aspects, the gap duration may be greater than 25 µs and the gap duration may not be counted in the COT. However, there may be a limit on the total transmission duration that includes all the gaps in-between.

In some aspects, the type 2 channel access procedure can be a type 2B channel access procedure if the gap between the previous TX/RX and the subsequent TX is exactly 16 µs. In some aspects, the type 2 channel access procedure can be a type 2C channel access procedure if the gap between the previous TX/RX and the subsequent TX is less than or equal to 16 µs.

In some aspects, the types of type 2 channel access procedures that an IAB network supports may be controlled by the IAB donor of the IAB networks. For example, the control unit (CU) of the IAB donor (e.g., the CU of the IAB donor 105c of the IAB network 300, the CU of the IAB donor 410 of IAB network 400 or the CU 415 of the IAB donor 455 of IAB network 450) may configure the COT-sharing IAB nodes using F1 application protocol (AP) messages via F1 interface connecting the CU to the DU of the same IAB donor (e.g., F1 interface connecting CU 415 to DU 425). In other words, the CU may communicate with the IAB nodes via the DU to allow the IAB nodes to perform the type 2 channel access procedures discussed herein (e.g., type 2A, type 2B and type 2C). In some aspects, in addition to or instead of using F1-AP messages, the CU may use RRC messages to configure the COT-sharing IAB nodes to perform the different types of channel access procedures. In some aspects, a parent IAB node may configure a child IAB node to perform any one of type 2 channel access procedures. For example, a parent DU (i.e., the DU of a parent IAB node) may configure the child IAB node via a MAC control element (MAC CE) or a DCI. In some aspects, the configurations may be pre-defined.

In some aspects, the configurations of IAB nodes to adopt any of the COT-sharing approaches and/or perform the channel access procedures can be based on the resource types of the DUs of the IAB nodes. For example, the configurations may specify which COT-sharing approaches (e.g., from baseline, cases 1, 2, 3 or 4 approaches) and/or channel access procedures (e.g., types 2A, 2B or 2C) can be adopted by an IAB based on the resource type of the DU of the IAB node, examples of the resource type including but not limited to hard, soft (available or non-available), not available, uplink, downlink, flexible, full duplex, etc. For instance, a subset of the COT-sharing approaches and/or a subset of the channel access procedures may be configured for adoption by an IAB node that has a DU with only one type of resource (e.g., soft resources or available soft resources scheduled or indicated via a DCI message (e.g., DCI2_5 message)). It is clear from the above discussion that the present disclosure contemplates the configuration of any and all combinations of COT-sharing approaches and/or channel access procedures.

In some aspects, the configurations of IAB nodes to adopt any of the COT-sharing approaches and/or perform the channel access procedures can be based on the channel type of the channel on which the COT is acquired for sharing. For example, the configurations may specify which COT-sharing approaches (e.g., from baseline, cases 1, 2, 3 or 4 approaches) and/or channel access procedures (e.g., types 2A, 2B or 2C) can be adopted by an IAB based on the channel type of the channel, examples of the channel type including but not limited to PDSCH, PUSCH, PDCCH, PUCCH, PRACH, SRS, CSI-RS, SSB, etc. For instance, a subset of the COT-sharing approaches and/or a subset of the channel access procedures may be configured for adoption by an IAB node that has a DU with only one type of resource (e.g., soft resources or available soft resources scheduled or indicated via a DCI message (e.g., DCI2_5 message)).

In some aspects, the configurations of IAB nodes to adopt any of the COT-sharing approaches and/or perform the channel access procedures can also be based on a constraint that may be placed on the sharing of COT by entities co-located in an IAB node (e.g., co-located DU and MT) or by entities located in different IAB nodes. For example, the constraint may be that one entity of a co-located DU and MT may share a COT with the other entity when the transmission power of the other entity is below a threshold transmission power. That is, for instance, a MT or DU of an IAB may share COT with its co-located DU or MT, respectively, when (e.g., in some cases, only when) the DU or MT has a transmission power that is no greater than a threshold transmission power. As another example, the constraint may be related to transmission beam direction of the other entity. For instance, the constraint may be that one entity of a co-located DU and MT may share a COT with the other entity when (e.g., in some cases, only when) the transmission beam used by the other entity is selected from a specific subset of beams, or within a specific angular range of the beam used by the first entity. In some aspects, constraints may be configured by donor CU using RRC messages and/or F1 interface application protocol (F 1-AP) messages. It is clear from the above discussion that the present disclosure contemplates the configuration of any and all combinations of COT-sharing approaches and/or channel access procedures.

Figure 15:
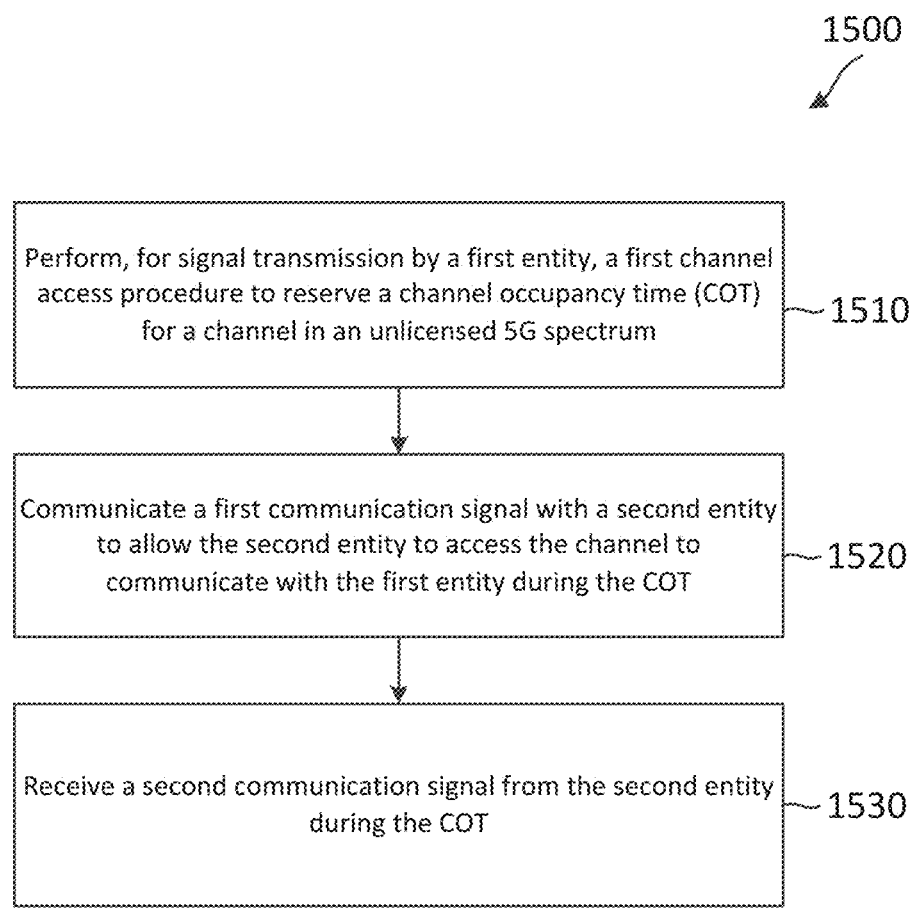
FIG. 15 is a flow diagram of a method for sharing COT between IAB nodes in a baseline approach according to aspects of the present disclosure.

FIG. 15 is a flow diagram of a method for sharing COT between IAB nodes of an IAB network in a baseline approach according to aspects of the present disclosure. The IAB network may be similar to the networks 100, 200, 300, 400 or 450 and may be configured with the topology 400 and/or 450. Steps of the method 1500 can be executed by a computing device (e.g., a processor, processing circuit, and/or other suitable component) of a wireless communication device, such as the IAB nodes of the IAB network (e.g., the BSs or IAB node 105, 465 or 466, the IAB donor 410 or 455, etc.) and UEs (e.g., the UEs 115 or 475). As illustrated, the method 1500 includes a number of enumerated steps, but aspects of the method 1500 may include additional steps before, after, and in between the enumerated steps. In some aspects, one or more of the enumerated steps may be omitted or performed in a different order.

At block 1510, the method 1500 includes performing, for signal transmission by a first entity of an integrated access backhaul (IAB) node including a first entity and a second entity, a first channel access procedure to reserve a channel occupancy time (COT) for a channel in an unlicensed 5G spectrum. The first entity and the second entity may be co-located in the IAB node.

In some instances, the IAB node may utilize one or more components, such as the processor 1402, the memory 1404, the COT sharing module 1408, the transceiver 1410, the modem 1412, and/or the one or more antennas 1416, to perform, for signal transmission by a first entity of an integrated access backhaul (IAB) node including a first entity and a second entity, a first channel access procedure to reserve a channel occupancy time (COT) for a channel in an unlicensed 5G spectrum.

At block 1520, the method 1500 includes allowing the second entity to access the channel and communicate a communication signal via the channel, during the COT. In some aspects, one of the first entity or the second entity can be a distributed unit (DU) of the IAB and the other entity can be a mobile terminal (MT) of the IAB.

In some instances, the IAB node may utilize one or more components, such as the processor 1402, the memory 1404, the COT sharing module 1408, the transceiver 1410, the modem 1412, and/or the one or more antennas 1416, to allow the second entity to access the channel and communicate a communication signal via the channel, during the COT.

At block 1530, the method 1500 includes performing a second channel access procedure for the second entity to access the channel and communicate the communication signal, during the COT.

In some instances, the IAB node may utilize one or more components, such as the processor 1402, the memory 1404, the COT sharing module 1408, the transceiver 1410, the modem 1412, and/or the one or more antennas 1416, to perform a second channel access procedure for the second entity to access the channel and communicate the communication signal, during the COT.

In some aspects, performing the second channel access procedure may be based on a resource type of the first entity and/or the second entity. In some aspects, performing the second channel access procedure may be based on a type of the channel.

In some aspects, the first channel access procedure can be a type 1 channel access procedure. In some aspects, the second channel access procedure can be a type 2 channel access procedure.

In some aspects, the first entity is the DU and the second entity is the MT; and the communication signal includes information related to the second channel access procedure performed by the MT. In some aspects, the communication signal may exclude information related to sharing of the COT. In some aspects, the first entity is the DU and the second entity is the MT, and the method 1500 further comprises switching by the MT from a prior type 1 channel access procedure to a type 2 channel access procedure before communicating the communication signal during the COT. In some aspects, the second channel access procedure may be performed within the COT.

In some aspects, the method 1500 includes determining there is a transmission gap between last transmission of a signal in the channel and a next transmission by the second entity in the channel. In some aspects, the transmission gap is no less than 25 microseconds. In such aspects, the second channel access procedure is a type 2A channel access procedure. In some aspects, the transmission gap is equal to 16 microseconds and the second channel access procedure is a type 2B channel access procedure. In some aspects, the transmission gap is no greater than 16 microseconds and the second channel access procedure is a type 2C channel access procedure. In some aspects, the second channel access procedure is a type 2A channel access procedure only when the transmission gap is equal to 25 microseconds.

Figure 16:
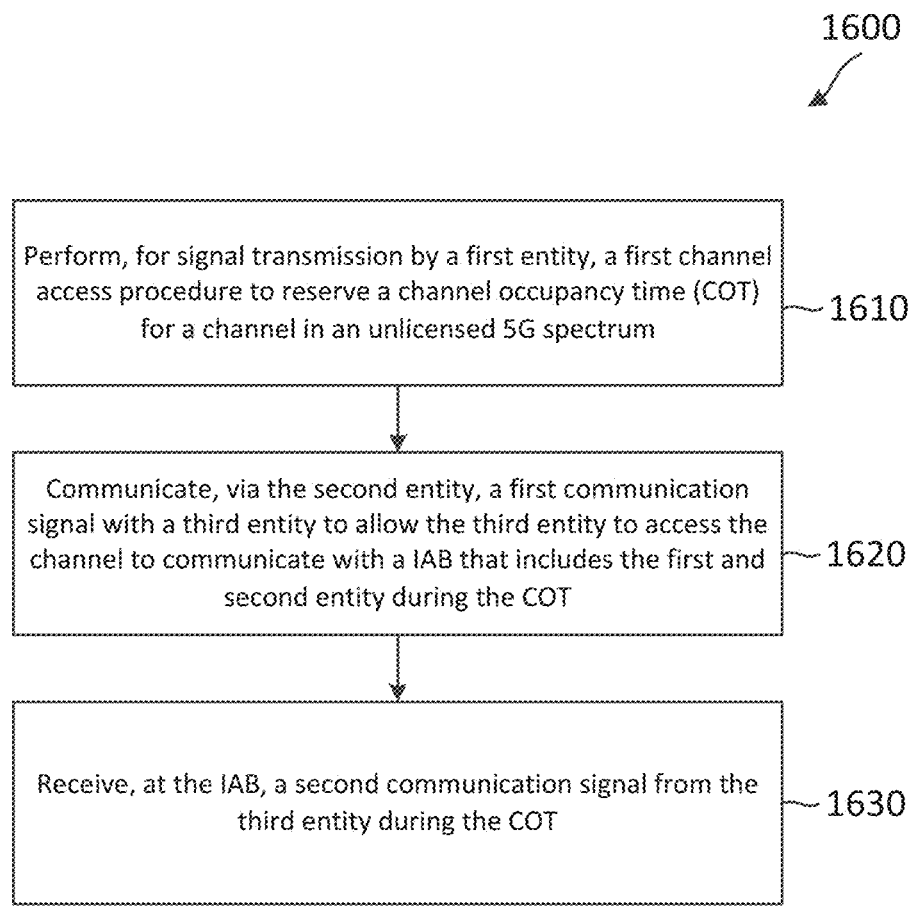
FIG. 16 is a flow diagram of a method for sharing COT between IAB nodes in an extended approach according to aspects of the present disclosure.

FIG. 16 is a flow diagram of a method for sharing COT between IAB nodes in an extended approach according to aspects of the present disclosure. The IAB network may be similar to the networks 100, 200, 300, 400 or 450 and may be configured with the topology 400 and/or 450. Steps of the method 1600 can be executed by a computing device (e.g., a processor, processing circuit, and/or other suitable component) of a wireless communication device, such as the IAB nodes of the IAB network (e.g., the BSs or IAB node 105, 465 or 466, the IAB donor 410 or 455, etc.) and UEs (e.g., the UEs 115 or 475). As illustrated, the method 1600 includes a number of enumerated steps, but aspects of the method 1600 may include additional steps before, after, and in between the enumerated steps. In some aspects, one or more of the enumerated steps may be omitted or performed in a different order.

At block 1610, the method 1600 includes performing, for signal transmission by a first entity of an integrated access backhaul (IAB) node, a first channel access procedure to reserve a channel occupancy time (COT) for a channel in an unlicensed 5G spectrum.

In some instances, the IAB node may utilize one or more components, such as the processor 1402, the memory 1404, the COT sharing module 1408, the transceiver 1410, the modem 1412, and/or the one or more antennas 1416, to perform, for signal transmission by a first entity of an integrated access backhaul (IAB) node, a first channel access procedure to reserve a channel occupancy time (COT) for a channel in an unlicensed 5G spectrum.

At block 1620, the method 1600 includes communicating, via a second entity of the IAB node, a first communication signal with a third entity to allow the third entity to access the channel and communicate with the IAB, during the COT.

In some instances, the IAB node may utilize one or more components, such as the processor 1402, the memory 1404, the COT sharing module 1408, the transceiver 1410, the modem 1412, and/or the one or more antennas 1416, to communicate, via a second entity of the IAB node, a first communication signal with a third entity to allow the third entity to access the channel and communicate with the IAB, during the COT.

In some aspects, the third entity performs a second channel access procedure to access the channel to communicate with the IAB. In some aspects, the second channel access procedure can be a type 2 channel access procedure. In some aspects, the first channel access procedure can be a type 1 channel access procedure.

At block 1630, the method 1600 includes receiving, at the IAB, a second communication signal from the third entity during the COT.

In some instances, the IAB node may utilize one or more components, such as the processor 1402, the memory 1404, the COT sharing module 1408, the transceiver 1410, the modem 1412, and/or the one or more antennas 1416, to receive, at the IAB, a second communication signal from the third entity during the COT.

In some aspects, the first entity is a first distributed unit (DU), the second entity is a mobile terminal (MT) and the third entity is a parent DU of the IAB. In such aspects, the communicating the first communication signal with the third entity is based on a resource type of the first DU. In yet some aspects, the first entity is a first MT, the second entity is a DU and the third entity is a user equipment (UE) or a child MT of the IAB.

In some aspects, the first entity can be the first DU, the second entity can be the MT and the third entity can be the parent DU of the IAB node; and the first communication signal includes an uplink (UL) communication signal having information to be communicated from the MT to the parent DU of the IAB node. In some aspects, the information includes channel access information related to a switch from a type 1 channel access procedure to a type 2 channel access procedure performed by the MT prior to communicating the first communication signal. In some aspects, the information includes COT sharing information related to the COT. In some aspects, the information includes a request indicating a channel access procedure to be performed by the parent DU for incoming signal transmission.

In some aspects, the third entity determines there is a transmission gap between last transmission of a signal in the channel and a next transmission by the third entity in the channel. In some aspects, the transmission gap can be no less than 25 microseconds and the second channel access procedure can be a type 2A channel access procedure. In yet some aspects, the transmission gap cam be equal to 16 microseconds and the second channel access procedure can be a type 2B channel access procedure. In some aspects, the transmission gap can be no greater than 16 microseconds and the second channel access procedure can be a type 2C channel access procedure.

Figure 17:
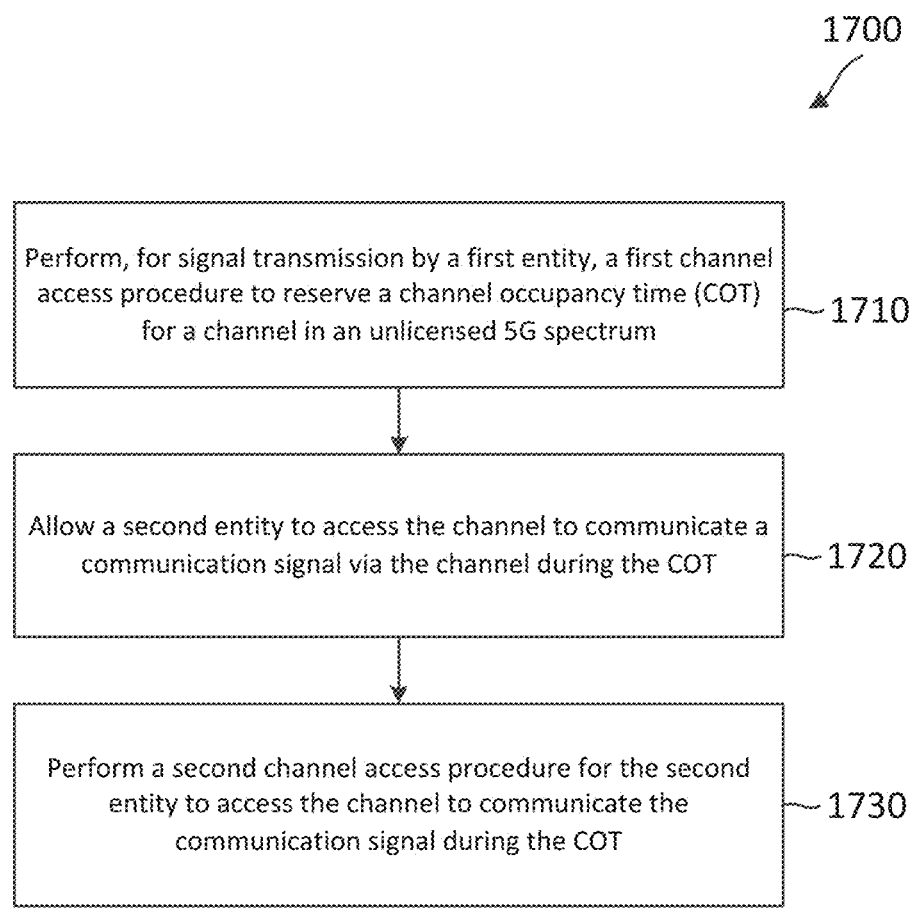
FIG. 17 is a flow diagram of a method for sharing COT between IAB nodes in an extended approach according to aspects of the present disclosure.

FIG. 17 is a flow diagram of a method for sharing COT between IAB nodes in an extended approach according to aspects of the present disclosure. The IAB network may be similar to the networks 100, 200, 300, 400 or 450 and may be configured with the topology 400 and/or 450. Steps of the method 1700 can be executed by a computing device (e.g., a processor, processing circuit, and/or other suitable component) of a wireless communication device, such as the IAB nodes of the IAB network (e.g., the BSs or IAB node 105, 465 or 466, the IAB donor 410 or 455, etc.) and UEs (e.g., the UEs 115 or 475). As illustrated, the method 1700 includes a number of enumerated steps, but aspects of the method 1700 may include additional steps before, after, and in between the enumerated steps. In some aspects, one or more of the enumerated steps may be omitted or performed in a different order.

At block 1710, the method 1700 includes performing, for signal transmission by a first entity of an integrated access backhaul (IAB), a first channel access procedure to reserve a channel occupancy time (COT) for a channel in an unlicensed 5G spectrum.

In some instances, the IAB node may utilize one or more components, such as the processor 1402, the memory 1404, the COT sharing module 1408, the transceiver 1410, the modem 1412, and/or the one or more antennas 1416, to perform, for signal transmission by a first entity of an integrated access backhaul (IAB), a first channel access procedure to reserve a channel occupancy time (COT) for a channel in an unlicensed 5G spectrum.

At block 1720, the method 1700 includes communicating a first communication signal with a second entity of the IAB to allow the second entity to access the channel and communicate with the first entity, during the COT.

In some instances, the IAB node may utilize one or more components, such as the processor 1402, the memory 1404, the COT sharing module 1408, the transceiver 1410, the modem 1412, and/or the one or more antennas 1416, to allow the second entity to access the channel and communicate with the first entity, during the COT.

In some aspects, the first entity can be a distributed unit (DU) of the first IAB node, and the second entity is either (i) a user equipment (UE) or (ii) a mobile terminal (MT) of a second IAB node that is a child node of the first IAB node. In yet other respects, the first entity is a MT of the first IAB node, and the second entity is a DU of a second IAB node that is a parent node to the first IAB node.

At block 1730, the method 1700 includes receiving a second communication signal from the second entity during the COT.

In some instances, the IAB node may utilize one or more components, such as the processor 1402, the memory 1404, the COT sharing module 1408, the transceiver 1410, the modem 1412, and/or the one or more antennas 1416, to receive a second communication signal from the second entity during the COT.

In some aspects, the first entity is the DU of the first IAB node, and the second entity is the MT of the second IAB node; and the MT can perform a type 2 channel access procedure to access the channel and communicate with the DU. In some aspects, the MT can switch from a type 1 channel access procedure to the type 2 channel access procedure prior to accessing the channel. In some aspects, the MT can switch from a type 1 channel access procedure to the type 2 channel access procedure in response to receiving a dynamic indication from the DU. In some aspects, the dynamic indication can be based on quality of signal traffic type for uplink (UL) transmission to the DU by the MT, a channel access priority class of the type 1 channel access procedure, a type of the channel, a buffer status of the UL transmission, a resource type of the DU, a resource type of the MT and/or a transmission configuration indication (TCI) state of the UL transmission.

In some aspects, the MT can switch from a type 1 channel access procedure to the type 2 channel access procedure based on a semi-static configuration established by an IAB donor of an IAB network including the IAB node. In some aspects, the MT can switch from a type 1 channel access procedure to the type 2 channel access procedure without input from the DU. In some aspects, the MT may transmit to the DU a notification of the switch from a type 1 channel access procedure to the type 2 channel access procedure.

Some aspects of the present disclosure include an apparatus, comprising a processor configured to perform, for signal transmission by a first entity of an integrated access backhaul (IAB) node, a first channel access procedure to acquire a channel occupancy time (COT) for a channel in an unlicensed 5G spectrum. The processor is further configured to allow a second entity of the IAB node to access the channel and communicate a communication signal via the channel, during the COT. Further, the processor is configured to perform a second channel access procedure for the second entity to access the channel and communicate the communication signal, during the COT. In some aspects, the first entity and the second entity are co-located in the IAB node; and one of the first entity or the second entity is a distributed unit (DU) of the IAB node and the other entity is a mobile terminal (MT) of the IAB node.

In some aspects, the first channel access procedure is a type 1 channel access procedure. In some aspects, the second channel access procedure is a type 2 channel access procedure. In some aspects, the performing the second channel access procedure is based on a resource type of the first entity and/or the second entity. In some aspects, the performing the second channel access procedure is based on a type of the channel. In some aspects, the first entity is the DU and the second entity is the MT; and the communication signal includes information related to the second channel access procedure performed by the MT. In some aspects, the first entity is the MT and the second entity is the DU; and the communication signal excludes information related to sharing of the COT. In some aspects, the processor is further configured to determine existence of a transmission gap between a last transmission of a signal in the channel and a next transmission by the second entity of a signal in the channel. In some aspects, the transmission gap is no less than 25 microseconds. In some aspects, the second channel access procedure is a type 2A channel access procedure. In some aspects, the transmission gap is equal to 16 microseconds and the second channel access procedure is a type 2B channel access procedure. In some aspects, the transmission gap is no greater than 16 microseconds and the second channel access procedure is a type 2C channel access procedure. In some aspects, the first entity is the DU and the second entity is the MT, the processor is further configured to switch by the MT from a prior type 1 channel access procedure to a type 2 channel access procedure before performing the second channel access procedure. In some aspects, the second channel access procedure is a type 2A channel access procedure only when the transmission gap is equal to 25 microseconds.

Some aspects of the present disclosure disclose an apparatus, comprising: a processor configured to perform, for signal transmission by a first entity of an integrated access backhaul (IAB) node, a first channel access procedure to acquire a channel occupancy time (COT) for a channel in an unlicensed 5G spectrum. The apparatus further comprises a transceiver configured to: communicate, via a second entity of the IAB node co-located with the first entity, a first communication signal with a third entity to allow the third entity to access the channel and communicate with the IAB node, during the COT; and receive, at the IAB node, a second communication signal from the third entity during the COT. In some aspects, the first entity is a first distributed unit (DU), the second entity is a mobile terminal (MT) and the third entity is a parent DU of the IAB node, or the first entity is a first MT, the second entity is a DU and the third entity is a user equipment (UE) or a child MT of the IAB node.

In some aspects, the third entity performs a second channel access procedure to access the channel and communicate with the IAB node. In some aspects, the second channel access procedure is a type 2 channel access procedure. In some aspects, the first channel access procedure is a type 1 channel access procedure. In some aspects, the third entity determines there is a transmission gap between a last transmission of a signal in the and a next transmission by the third entity of a signal in the channel. In some aspects, the transmission gap is no less than 25 microseconds and the second channel access procedure is a type 2A channel access procedure. In some aspects, the transmission gap is equal to 16 microseconds and the second channel access procedure is a type 2B channel access procedure. In some aspects, the transmission gap is no greater than 16 microseconds and the second channel access procedure is a type 2C channel access procedure. In some aspects, the first entity is the first DU, the second entity is the MT and the third entity is the parent DU of the IAB node; and the first communication signal includes an uplink (UL) communication signal having information to be communicated from the MT to the parent DU of the IAB node. In some aspects, the information includes channel access information related to a switch from a type 1 channel access procedure to a type 2 channel access procedure performed by the MT prior to communicating the first communication signal. In some aspects, the information includes COT sharing information related to the COT. In some aspects, the information includes a request indicating a channel access procedure to be performed by the parent DU for incoming signal transmission. In some aspects, the communicating the first communication signal with the third entity is based on a resource type of the first DU.

Some aspects of the present disclosure disclose an apparatus, comprising: a processor configured to: perform, for signal transmission by a first entity of a first integrated access backhaul (IAB) node, a first channel access procedure to acquire a channel occupancy time (COT) for a channel in an unlicensed 5G spectrum. In some aspects, the apparatus further comprises a transceiver configured to: communicate a first communication signal with a second entity to allow the second entity to access the channel and communicate with the first entity, during the COT; and receive a second communication signal from the second entity during the COT. In some aspects, the first entity is a distributed unit (DU) of the first IAB node, and the second entity is either (i) a user equipment (UE) or (ii) a mobile terminal (MT) of a second IAB node that is a child node of the first IAB node; or the first entity is a MT of the first IAB node, and the second entity is a DU of a second IAB node that is a parent node to the first IAB node.

In some aspects, the first entity is the DU of the first IAB node, and the second entity is the MT of the second IAB node; and the MT performs a type 2 channel access procedure to access the channel and communicate with the DU. In some aspects, the MT switches from a type 1 channel access procedure to the type 2 channel access procedure prior to accessing the channel. In some aspects, the MT switches from a type 1 channel access procedure to the type 2 channel access procedure in response to receiving a dynamic indication from the DU. In some aspects, the dynamic indication is based on quality of signal traffic type for uplink (UL) transmission to the DU by the MT, a channel access priority class of the type 1 channel access procedure, a type of the channel, a buffer status of the UL transmission, a resource type of the DU, a resource type of the MT and/or a transmission configuration indication (TCI) state of the UL transmission. In some aspects, the MT switches from a type 1 channel access procedure to the type 2 channel access procedure based on a semi-static configuration established by an IAB donor of an IAB network including the IAB node. In some aspects, the MT switches from a type 1 channel access procedure to the type 2 channel access procedure without input from the DU. In some aspects, the MT transmits to the DU a notification of the switch from a type 1 channel access procedure to the type 2 channel access procedure.

Some aspects of the present disclosure disclose a non-transitory computer-readable medium (CRM) having program code recorded thereon, the program code comprising: code for causing an integrated access backhaul (IAB) node that includes a first entity and a second entity to perform, for signal transmission by the first entity, a first channel access procedure to acquire a channel occupancy time (COT) for a channel in an unlicensed 5G spectrum. The program code further comprises code for causing the IAB node to allow the second entity to access the channel and communicate a communication signal via the channel, during the COT. Further, the program code comprises code for causing the IAB node to perform a second channel access procedure for the second entity to access the channel and communicate the communication signal, during the COT. In some aspects, the first entity and the second entity are co-located in the IAB nod. In some aspects, one of the first entity or the second entity is a distributed unit (DU) of the IAB node and the other entity is a mobile terminal (MT) of the IAB node.

In some aspects, the first channel access procedure is a type 1 channel access procedure. In some aspects, the second channel access procedure is a type 2 channel access procedure. In some aspects, the performing the second channel access procedure is based on a resource type of the first entity and/or the second entity. In some aspects, the performing the second channel access procedure is based on a type of the channel. In some aspects, the first entity is the DU and the second entity is the MT; and the communication signal includes information related to the second channel access procedure performed by the MT. In some aspects, the first entity is the MT and the second entity is the DU; and the communication signal excludes information related to sharing of the COT. In some aspects, the program code further comprises code for causing the IAB node to determine there is a transmission gap between a last transmission of a signal in the channel and a next transmission by the second entity of a signal in the channel. In some aspects, the transmission gap is no less than 25 microseconds. In some aspects, the second channel access procedure is a type 2A channel access procedure. In some aspects, the transmission gap is equal to 16 microseconds and the second channel access procedure is a type 2B channel access procedure. In some aspects, the transmission gap is no greater than 16 microseconds and the second channel access procedure is a type 2C channel access procedure. In some aspects, the first entity is the DU and the second entity is the MT, the program code further comprising: code for causing the MT of the IAB node to switch from a prior type 1 channel access procedure to a type 2 channel access procedure before performing the second channel access procedure. In some aspects, the second channel access procedure is a type 2A channel access procedure only when the transmission gap is equal to 25 microseconds.

Some aspects of the present disclosure disclose a non-transitory computer-readable medium (CRM) having program code recorded thereon, the program code comprising: code for causing an integrated access backhaul (IAB) node that includes a first entity and a second entity co-located with the first entity to perform, for signal transmission by the first entity, a first channel access procedure to acquire a channel occupancy time (COT) for a channel in an unlicensed 5G spectrum. In some aspects, the program code further comprises code for causing the IAB node to communicate, via the second entity, a first communication signal with a third entity to allow the third entity to access the channel and communicate with the IAB node, during the COT. In some aspects, the program code further comprises code for causing the IAB node to receive, at the IAB node, a second communication signal from the third entity during the COT. In some aspects, the first entity is a first distributed unit (DU), the second entity is a mobile terminal (MT) and the third entity is a parent DU of the IAB node, or the first entity is a first MT, the second entity is a DU and the third entity is a user equipment (UE) or a child MT of the IAB node.

In some aspects, the third entity performs a second channel access procedure to access the channel and communicate with the IAB node. In some aspects, the second channel access procedure is a type 2 channel access procedure. In some aspects, the first channel access procedure is a type 1 channel access procedure. In some aspects, the third entity determines there is a transmission gap between a last transmission of a signal in the channel and a next transmission by the third entity of a signal in the channel. In some aspects, the transmission gap is no less than 25 microseconds and the second channel access procedure is a type 2A channel access procedure. In some aspects, the transmission gap is equal to 16 microseconds and the second channel access procedure is a type 2B channel access procedure. In some aspects, the transmission gap is no greater than 16 microseconds and the second channel access procedure is a type 2C channel access procedure. In some aspects, the first entity is the first DU, the second entity is the MT and the third entity is the parent DU of the IAB node; and the first communication signal includes an uplink (UL) communication signal having information to be communicated from the MT to the parent DU of the IAB node. In some aspects, the information includes channel access information related to a switch from a type 1 channel access procedure to a type 2 channel access procedure performed by the MT prior to communicating the first communication signal. In some aspects, the information includes COT sharing information related to the COT. In some aspects, the information includes a request indicating a channel access procedure to be performed by the parent DU for incoming signal transmission. In some aspects, the communicating the first communication signal with the third entity is based on a resource type of the first DU.

Some aspects of the present disclosure disclose a non-transitory computer-readable medium (CRM) having program code recorded thereon, the program code comprising: code for causing a first entity of a first integrated access backhaul (IAB) node to perform, for signal transmission by the first entity, a first channel access procedure to acquire a channel occupancy time (COT) for a channel in an unlicensed 5G spectrum. The program code further comprises code for causing the first entity to communicate a first communication signal with a second entity to allow the second entity to access the channel and communicate with the first entity, during the COT. Further, the program code comprises code for causing the first entity to receive a second communication signal from the second entity during the COT. In some aspects, the first entity is a distributed unit (DU) of the first IAB node, and the second entity is either (i) a user equipment (UE) or (ii) a mobile terminal (MT) of a second IAB node that is a child node of the first IAB node; or the first entity is a MT of the first IAB node, and the second entity is a DU of a second IAB node that is a parent node to the first IAB node.

In some aspects, the first entity is the DU of the first IAB node, and the second entity is the MT of the second IAB node; and the MT performs a type 2 channel access procedure to access the channel and communicate with the DU. In some aspects, the MT switches from a type 1 channel access procedure to the type 2 channel access procedure prior to accessing the channel. In some aspects, the MT switches from a type 1 channel access procedure to the type 2 channel access procedure in response to receiving a dynamic indication from the DU. In some aspects, the dynamic indication is based on quality of signal traffic type for uplink (UL) transmission to the DU by the MT, a channel access priority class of the type 1 channel access procedure, a type of the channel, a buffer status of the UL transmission, a resource type of the DU, a resource type of the MT and/or a transmission configuration indication (TCI) state of the UL transmission. In some aspects, the MT switches from a type 1 channel access procedure to the type 2 channel access procedure based on a semi-static configuration established by an IAB donor of an IAB network including the IAB node. In some aspects, the MT switches from a type 1 channel access procedure to the type 2 channel access procedure without input from the DU. In some aspects, the MT transmits to the DU a notification of the switch from a type 1 channel access procedure to the type 2 channel access procedure.

Some aspects of the present disclosure disclose an apparatus, comprising: means for performing, for signal transmission by a first entity of an integrated access backhaul (IAB) node including a first entity and a second entity, a first channel access procedure to acquire a channel occupancy time (COT) for a channel in an unlicensed 5G spectrum. The apparatus further comprises means for allowing the second entity to access the channel and communicate a communication signal via the channel, during the COT. Further, the apparatus comprises means for performing a second channel access procedure for the second entity to access the channel and communicate the communication signal, during the COT. In some aspects, the first entity and the second entity are co-located in the IAB node; and one of the first entity or the second entity is a distributed unit (DU) of the IAB node and the other entity is a mobile terminal (MT) of the IAB node.

In some aspects, the first channel access procedure is a type 1 channel access procedure. In some aspects, the second channel access procedure is a type 2 channel access procedure. In some aspects, the performing the second channel access procedure is based on a resource type of the first entity and/or the second entity. In some aspects, the performing the second channel access procedure is based on a type of the channel. In some aspects, the first entity is the DU and the second entity is the MT; and the communication signal includes information related to the second channel access procedure performed by the MT. In some aspects, the first entity is the MT and the second entity is the DU; and the communication signal excludes information related to sharing of the COT. In some aspects, the apparatus further comprises means for determining there is a transmission gap between a last transmission of a signal in the channel and a next transmission by the second entity of a signal in the channel. In some aspects, the transmission gap is no less than 25 microseconds. In some aspects, the second channel access procedure is a type 2A channel access procedure. In some aspects, the transmission gap is equal to 16 microseconds and the second channel access procedure is a type 2B channel access procedure. In some aspects, the transmission gap is no greater than 16 microseconds and the second channel access procedure is a type 2C channel access procedure. In some aspects, the first entity is the DU and the second entity is the MT, the apparatus further comprising: means for switching by the MT from a prior type 1 channel access procedure to a type 2 channel access procedure before performing the second channel access procedure. In some aspects, the second channel access procedure is a type 2A channel access procedure only when the transmission gap is equal to 25 microseconds.

Some aspects of the present disclosure disclose an apparatus, comprising: means for performing, for signal transmission by a first entity of an integrated access backhaul (IAB) node including the first entity and a second entity co-located with the first entity, a first channel access procedure to acquire a channel occupancy time (COT) for a channel in an unlicensed 5G spectrum. The apparatus further comprises means for communicating, via the second entity, a first communication signal with a third entity to allow the third entity to access the channel and communicate with the IAB node, during the COT. Further, the apparatus comprises means for receiving, at the IAB node, a second communication signal from the third entity during the COT. In some aspects, the first entity is a first distributed unit (DU), the second entity is a mobile terminal (MT) and the third entity is a parent DU of the IAB node, or the first entity is a first MT, the second entity is a DU and the third entity is a user equipment (UE) or a child MT of the IAB node.

In some aspects, the third entity performs a second channel access procedure to access the channel and communicate with the IAB node. In some aspects, the second channel access procedure is a type 2 channel access procedure. In some aspects, the first channel access procedure is a type 1 channel access procedure. In some aspects, the third entity determines there is a transmission gap since last transmission of a signal in the channel before the third entity performs the second channel access procedure. In some aspects, the transmission gap is no less than 25 microseconds and the second channel access procedure is a type 2A channel access procedure. In some aspects, the transmission gap is equal to 16 microseconds and the second channel access procedure is a type 2B channel access procedure. In some aspects, the transmission gap is no greater than 16 microseconds and the second channel access procedure is a type 2C channel access procedure. In some aspects, the first entity is the first DU, the second entity is the MT and the third entity is the parent DU of the IAB node; and the first communication signal includes an uplink (UL) communication signal having information to be communicated from the MT to the parent DU of the IAB node. In some aspects, the information includes channel access information related to a switch from a type 1 channel access procedure to a type 2 channel access procedure performed by the MT prior to communicating the first communication signal. In some aspects, the information includes COT sharing information related to the COT. In some aspects, the information includes a request indicating a channel access procedure to be performed by the parent DU for incoming signal transmission. In some aspects, the communicating the first communication signal with the third entity is based on a resource type of the first DU.

Some aspects of the present disclosure disclose an apparatus, comprising: means for performing, for signal transmission by a first entity of a first integrated access backhaul (IAB) node, a first channel access procedure to acquire a channel occupancy time (COT) for a channel in an unlicensed 5G spectrum. The apparatus further comprises means for communicating a first communication signal with a second entity to allow the second entity to access the channel and communicate with the first entity, during the COT. Further, the apparatus comprises means for receiving a second communication signal from the second entity during the COT. In some aspects, the first entity is a distributed unit (DU) of the first IAB node, and the second entity is either (i) a user equipment (UE) or (ii) a mobile terminal (MT) of a second IAB node that is a child node of the first IAB node; or the first entity is a MT of the first IAB node, and the second entity is a DU of a second IAB node that is a parent node to the first IAB node.

In some aspects, the first entity is the DU of the first IAB node, and the second entity is the MT of the second IAB node; and the MT performs a type 2 channel access procedure to access the channel and communicate with the DU. In some aspects, the MT switches from a type 1 channel access procedure to the type 2 channel access procedure prior to accessing the channel. In some aspects, the MT switches from a type 1 channel access procedure to the type 2 channel access procedure in response to receiving a dynamic indication from the DU. In some aspects, the dynamic indication is based on quality of signal traffic type for uplink (UL) transmission to the DU by the MT, a channel access priority class of the type 1 channel access procedure, a type of the channel, a buffer status of the UL transmission, a resource type of the DU, a resource type of the MT and/or a transmission configuration indication (TCI) state of the UL transmission. In some aspects, the MT switches from a type 1 channel access procedure to the type 2 channel access procedure based on a semi-static configuration established by an IAB donor of an IAB network including the IAB node. In some aspects, the MT switches from a type 1 channel access procedure to the type 2 channel access procedure without input from the DU. In some aspects, the MT transmits to the DU a notification of the switch from a type 1 channel access procedure to the type 2 channel access procedure.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication performed by an integrated access backhaul (IAB) node including a first entity and a second entity, the method comprising:
    performing, for signal transmission by the first entity, a first channel access procedure to acquire a channel occupancy time (COT) for a channel in an unlicensed 5G spectrum;
    allowing the second entity to access the channel and communicate a communication signal via the channel, during the COT; and
    performing a second channel access procedure for the second entity to access the channel and communicate the communication signal, during the COT, wherein
        the first entity and the second entity are co-located in the IAB node; and
        one of the first entity or the second entity is a distributed unit (DU) of the IAB node and the other entity is a mobile terminal (MT) of the IAB node.

2. The method of claim 1, wherein the first channel access procedure is a type 1 channel access procedure and the second channel access procedure is a type 2 channel access procedure.

3. The method of claim 1, wherein the performing the second channel access procedure is based on a type of the channel or a resource type of the first entity and/or the second entity.

4. The method of claim 1, wherein:
    the first entity is the DU and the second entity is the MT; and the communication signal includes information related to the second channel access procedure performed by the MT.

5. The method of claim 1, wherein:
the first entity is the MT and the second entity is the DU; and
the communication signal excludes information related to sharing of the COT.

6. The method of claim 1, further comprising determining there is a transmission gap between a last transmission of a signal in the channel and a next transmission of a signal by the second entity in the channel.

7. The method of claim 6, wherein the transmission gap is no less than 25 microseconds and the second channel access procedure is a type 2A channel access procedure.

8. The method of claim 6, wherein the transmission gap is equal to 16 microseconds and the second channel access procedure is a type 2B channel access procedure.

9. The method of claim 6, wherein the transmission gap is no greater than 16 microseconds and the second channel access procedure is a type 2C channel access procedure.

10. The method of claim 6, wherein the second channel access procedure is a type 2A channel access procedure only when the transmission gap is equal to 25 microseconds.

11. The method of claim 1, wherein the first entity is the DU and the second entity is the MT, the method further comprising:
switching by the MT from a prior type 1 channel access procedure to a type 2 channel access procedure before performing the second channel access procedure.

12. A method of wireless communication performed by an integrated access backhaul (IAB) node including a first entity and a second entity co-located with the first entity, the method comprising:
performing, for signal transmission by the first entity, a first channel access procedure to acquire a channel occupancy time (COT) for a channel in an unlicensed 5G spectrum;
communicating, via the second entity, a first communication signal with a third entity to allow the third entity to access the channel and communicate with the TAB node, during the COT; and
receiving, at the TAB node, a second communication signal from the third entity during the COT, wherein:
the first entity is a first distributed unit (DU), the second entity is a mobile terminal (MT) and the third entity is a parent DU of the IAB node, or
the first entity is a first MT, the second entity is a DU and the third entity is a user equipment (UE) or a child MT of the IAB node.

13. The method of claim 12, wherein the third entity performs a second channel access procedure to access the channel and communicate with the IAB node.

14. The method of claim 13, wherein the first channel access procedure is a type 1 channel access procedure and the second channel access procedure is a type 2 channel access procedure.

15. The method of claim 13, wherein the third entity determines there is a transmission gap between a last transmission of a signal in the channel and a next transmission of a signal by the third entity in the channel.

16. The method of claim 15, wherein the transmission gap is no: (i) less than 25 microseconds and the second channel access procedure is a type 2A channel access procedure; (ii) equal to 16 microseconds and the second channel access procedure is a type 2B channel access procedure; or (iii) no greater than 16 microseconds and the second channel access procedure is a type 2C channel access procedure.

17. The method of any of claim 12, wherein:
the first entity is the first DU, the second entity is the MT and the third entity is the parent DU of the IAB node; and
the first communication signal includes an uplink (UL) communication signal having information to be communicated from the MT to the parent DU of the IAB node.

18. The method of claim 17, wherein the information includes channel access information related to a switch from a type 1 channel access procedure to a type 2 channel access procedure performed by the MT prior to communicating the first communication signal.

19. The method of claim 17, wherein the information includes COT sharing information related to the COT.

20. The method of claim 17, wherein the information includes a request indicating a channel access procedure to be performed by the parent DU for incoming signal transmission.

21. The method of claim 17, wherein:
the communicating the first communication signal with the third entity is based on a resource type of the first DU.

22. A method of wireless communication performed by a first entity of a first integrated access backhaul (TAB) node, comprising:
performing, for signal transmission by the first entity, a first channel access procedure to acquire a channel occupancy time (COT) for a channel in an unlicensed 5G spectrum;
communicating a first communication signal with a second entity to allow the second entity to access the channel and communicate with the first entity, during the COT; and
receiving a second communication signal from the second entity during the COT, wherein
the first entity is a distributed unit (DU) of the first TAB node, and the second entity is either (i) a user equipment (UE) or (ii) a mobile terminal (MT) of a second TAB node that is a child node of the first TAB node; or
the first entity is a MT of the first TAB node, and the second entity is a DU of a second TAB node that is a parent node to the first TAB node.

23. The method of claim 22, wherein:
the first entity is the DU of the first TAB node, and the second entity is the MT of the second TAB node; and
the MT performs a type 2 channel access procedure to access the channel and communicate with the DU.

24. The method of claim 23, wherein the MT switches from a type 1 channel access procedure to the type 2 channel access procedure prior to accessing the channel.

25. The method of claim 24, wherein the MT switches from a type 1 channel access procedure to the type 2 channel access procedure based on a semi-static configuration established by an IAB donor of an IAB network including the IAB node.

26. The method of claim 24, wherein the MT switches from a type 1 channel access procedure to the type 2 channel access procedure without input from the DU.

27. The method of claim 26, wherein the MT transmits to the DU a notification of the switch from a type 1 channel access procedure to the type 2 channel access procedure.

28. The method of claim 24, wherein the MT switches from a type 1 channel access procedure to the type 2 channel access procedure in response to receiving a dynamic indication from the DU.

29. The method of claim 28, wherein the dynamic indication is based on quality of signal traffic type for uplink (UL) transmission to the DU by the MT, a channel access priority class of the type 1 channel access procedure, a type of the channel, a buffer status of the UL transmission, a resource type of the DU, a resource type of the MT and/or a transmission configuration indication (TCI) state of the UL transmission.

30. An apparatus, comprising:
a processor configured to:
perform, for signal transmission by a first entity of an integrated access backhaul (IAB) node, a first channel access procedure to acquire a channel occupancy time (COT) for a channel in an unlicensed 5G spectrum;
allow a second entity of the IAB node to access the channel and communicate a communication signal via the channel, during the COT; and
perform a second channel access procedure for the second entity to access the channel and communicate the communication signal, during the COT, wherein the first entity and the second entity are co-located in the IAB node; and
one of the first entity or the second entity is a distributed unit (DU) of the IAB node and the other entity is a mobile terminal (MT) of the IAB node.

* * * * *